US012573385B2

(12) United States Patent
Luo et al.

(10) Patent No.: US 12,573,385 B2
(45) Date of Patent: Mar. 10, 2026

(54) VOICE INTERACTION METHOD AND ELECTRONIC DEVICE

(71) Applicant: Huawei Technologies Co., Ltd., Shenzhen (CN)

(72) Inventors: Hongfeng Luo, Shenzhen (CN); Yuxi Zhao, Shenzhen (CN); Wen Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 289 days.

(21) Appl. No.: 17/442,024

(22) PCT Filed: Mar. 14, 2020

(86) PCT No.: PCT/CN2020/079385
§ 371 (c)(1),
(2) Date: Sep. 22, 2021

(87) PCT Pub. No.: WO2020/192456
PCT Pub. Date: Oct. 1, 2020

(65) Prior Publication Data
US 2022/0172717 A1     Jun. 2, 2022

(30) Foreign Application Priority Data

Mar. 22, 2019    (CN) ......................... 201910224332.0

(51) Int. Cl.
G10L 15/22        (2006.01)
G06F 3/0482       (2013.01)
(Continued)

(52) U.S. Cl.
CPC ........... G10L 15/22 (2013.01); G06F 3/0482 (2013.01); G06F 3/167 (2013.01); G06F 9/453 (2018.02);
(Continued)

(58) Field of Classification Search
CPC ... G10L 15/22; G10L 2015/223; G10L 15/30; G06F 3/167; G06F 3/0482
See application file for complete search history.

(56) References Cited

U.S. PATENT DOCUMENTS 9,558,740 B1      1/2017  Mairesse et al.
10,741,185 B2 *   8/2020  Gruber ............... G06F 16/2457
(Continued)

FOREIGN PATENT DOCUMENTS

CN        103888600 A     6/2014
CN        105448293 A     3/2016
(Continued)

OTHER PUBLICATIONS

ITU-T H.264 "Series H: Audiovisual and Multimedia Systems, Infrastructure of audiovisual services—Coding of moving video, Advanced video coding for generic audiovisual services," Apr. 2017, 812 pages.
(Continued)

*Primary Examiner* — Samuel G Neway
(74) *Attorney, Agent, or Firm* — Conley Rose, P.C.

(57) ABSTRACT

A voice interaction includes. displaying a first interface in response to an operation of waking up a voice assistant application; receiving first voice input of the user, where the first voice input includes first slot information; displaying a first card in the first interface, where the first card includes N candidate options of the first slot information, where the N candidate options are in a one-to-one correspondence with N query requests, and where each query request in the N query requests carries a corresponding candidate option of the first slot information; and in response to an operation of selecting a first candidate option from the N candidate options by the user, sending a first query request corresponding to the first candidate option to a first server.

20 Claims, 18 Drawing Sheets

(51) Int. Cl.

| | |
|---|---|
| *G06F 3/16* | (2006.01) |
| *G06F 9/451* | (2018.01) |
| *G06F 16/334* | (2025.01) |
| *G06F 16/338* | (2019.01) |
| *G10L 15/26* | (2006.01) |
| *G10L 15/30* | (2013.01) |
| *H04M 1/725* | (2021.01) |

(52) U.S. Cl.
CPC ........ *G06F 16/3344* (2019.01); *G06F 16/338* (2019.01); *G10L 15/26* (2013.01); *G10L 15/30* (2013.01); *G10L 2015/223* (2013.01); *H04M 1/725* (2013.01)

(56) References Cited

U.S. PATENT DOCUMENTS

| | | | |
|---|---|---|---|
| 2004/0172258 | A1 | 9/2004 | Dominach et al. |
| 2012/0265528 | A1* | 10/2012 | Gruber .................. G10L 15/183 |
| | | | 704/235 |
| 2013/0073286 | A1 | 3/2013 | Bastea-Forte et al. |
| 2014/0040748 | A1* | 2/2014 | Lemay ................ G06F 3/04817 |
| | | | 715/728 |
| 2015/0154953 | A1 | 6/2015 | Bapat et al. |
| 2016/0150020 | A1 | 5/2016 | Farmer et al. |
| 2016/0371800 | A1* | 12/2016 | Kirshenboim ...... G06F 16/9537 |
| 2017/0068423 | A1* | 3/2017 | Napolitano ........... G06F 3/0488 |
| 2018/0196683 | A1* | 7/2018 | Radebaugh ........... G06F 16/951 |
| 2018/0307761 | A1* | 10/2018 | Felt ....................... G06F 16/685 |
| 2018/0308485 | A1 | 10/2018 | Kudurshian et al. |
| 2018/0336894 | A1* | 11/2018 | Graham .................. G10L 15/30 |
| 2018/0336897 | A1* | 11/2018 | Aggarwal ............... G06F 9/485 |
| 2019/0304461 | A1* | 10/2019 | Pan ........................ G10L 15/08 |
| 2020/0074993 | A1* | 3/2020 | Lee ........................ G10L 15/22 |
| 2022/0172717 | A1* | 6/2022 | Luo ........................ G10L 15/22 |

FOREIGN PATENT DOCUMENTS

| | | |
|---|---|---|
| CN | 106445940 A | 2/2017 |
| CN | 107193396 A | 9/2017 |
| CN | 107318036 A | 11/2017 |
| CN | 107680589 A | 2/2018 |
| WO | 2018213319 A1 | 11/2018 |

OTHER PUBLICATIONS

Kwang B. Lee et al: "The Design and Development of User Interfaces for Voice Application in Mobile Devices", International Professional Communication Conference, IEEE, PI, Oct. 1, 2006, 13 pages.

* cited by examiner

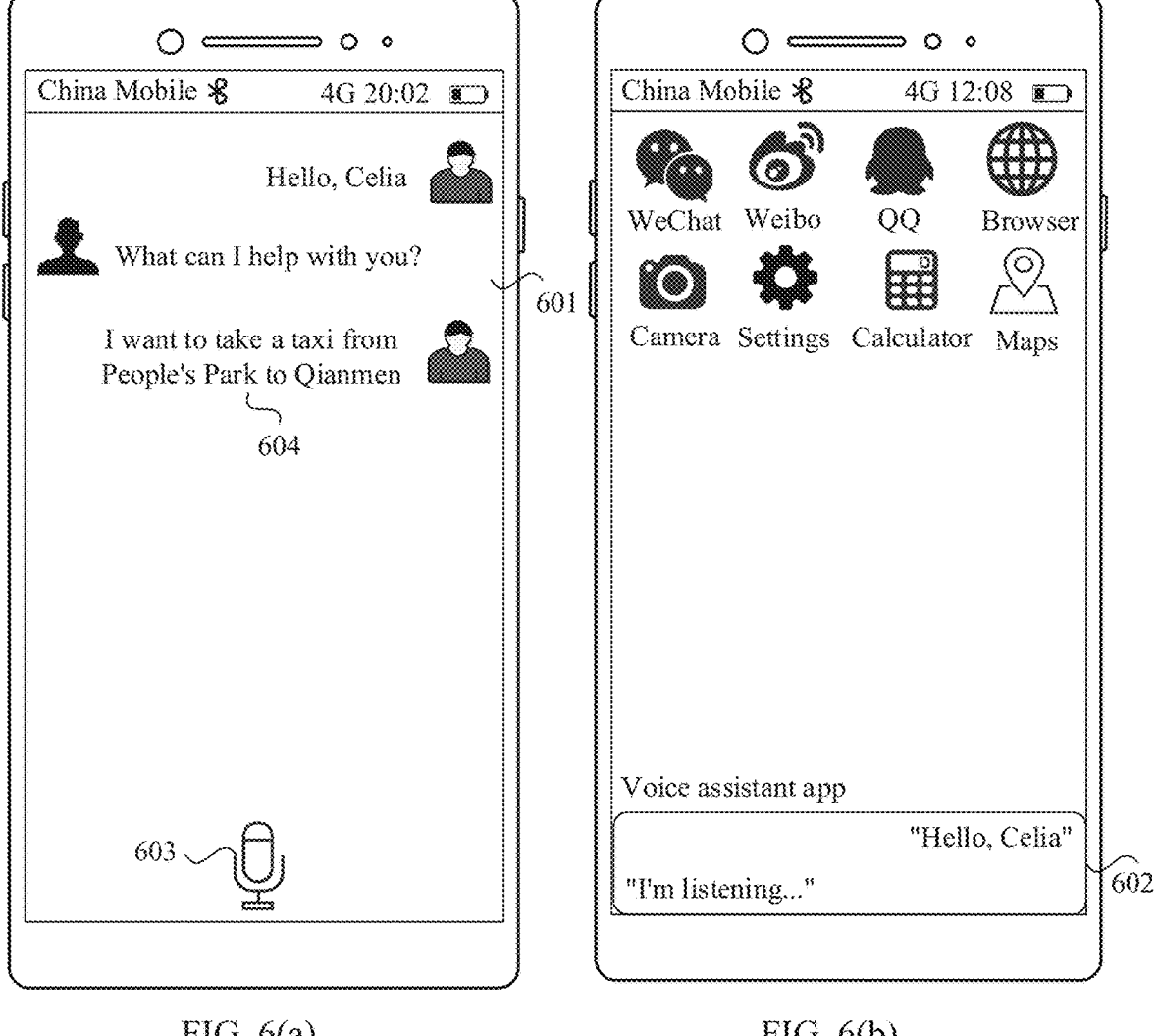
FIG. 6(a)                    FIG. 6(b)

TO

CONT.
FROM
FIG. 10(a)

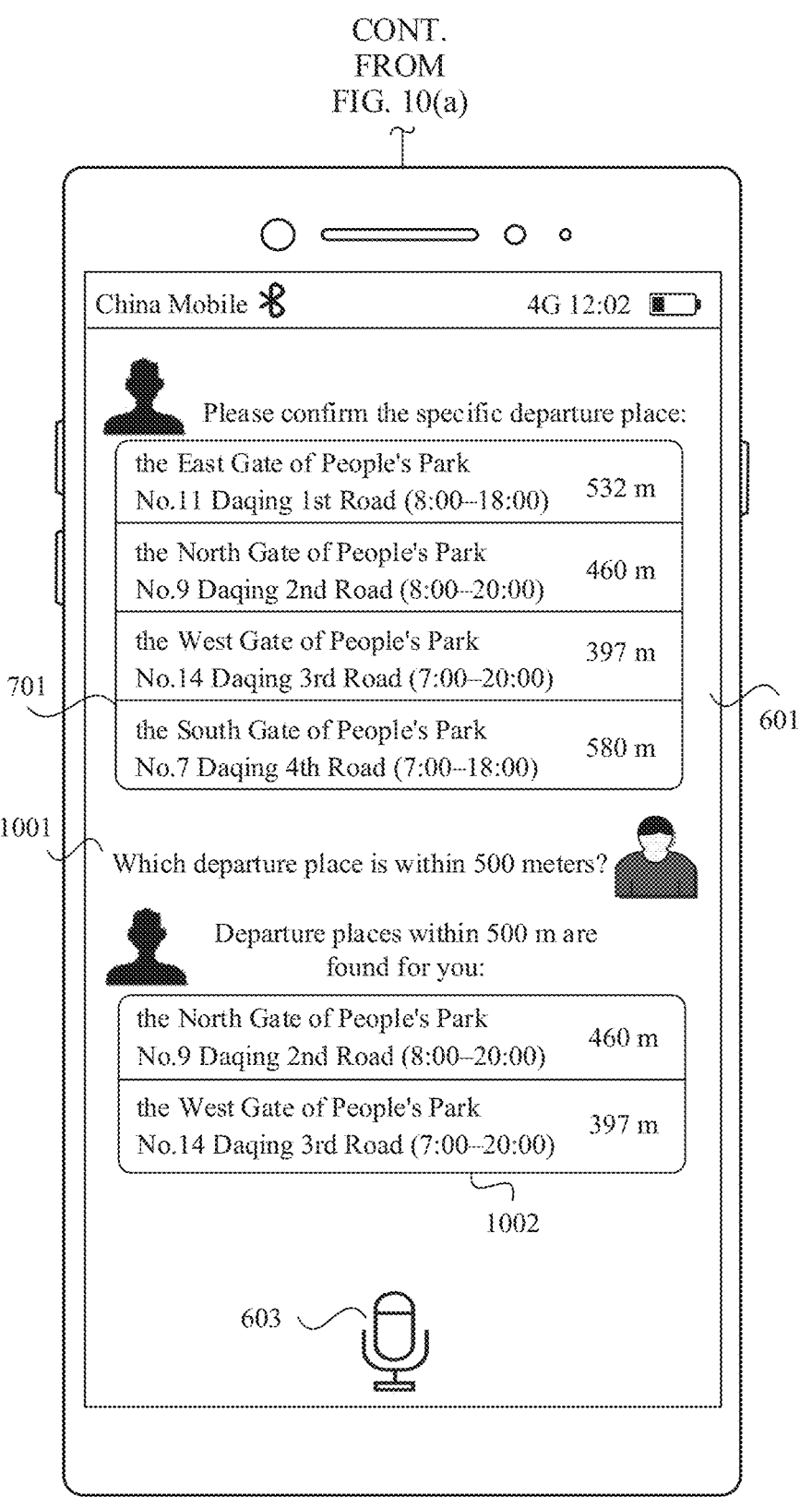

China Mobile ❈                    4G 12:02 ▭

Please confirm the specific departure place:

| the East Gate of People's Park No.11 Daqing 1st Road (8:00–18:00) | 532 m |
| the North Gate of People's Park No.9 Daqing 2nd Road (8:00–20:00) | 460 m |
| the West Gate of People's Park No.14 Daqing 3rd Road (7:00–20:00) | 397 m |
| the South Gate of People's Park No.7 Daqing 4th Road (7:00–18:00) | 580 m |

701

601

1001

Which departure place is within 500 meters?

Departure places within 500 m are found for you:

| the North Gate of People's Park No.9 Daqing 2nd Road (8:00–20:00) | 460 m |
| the West Gate of People's Park No.14 Daqing 3rd Road (7:00–20:00) | 397 m |

VOICE INTERACTION METHOD AND ELECTRONIC DEVICE

CROSS-REFERENCE TO RELATED APPLICATIONS

This is a National Stage of International Patent Application No. PCT/CN2020/079385 filed Mar. 14, 2020, which claims priority to Chinese Patent Application No. 201910224332.0 filed Mar. 22, 2019, both of which are hereby incorporated by reference in their entireties.

TECHNICAL FIELD

This application relates to the field of terminal technologies, and in particular, to a voice interaction method and an electronic device.

BACKGROUND

Human-computer interaction (HCI) is a process of exchanging information between a person and a computer to complete a specified task through specific interaction by using a conversational language between the person and the computer. Currently, a large quantity of graphical user interfaces (GUI) are used on an electronic device, for example, a mobile phone, to implement a human-computer interaction process with a user.

With development of a voice recognition technology, a voice assistant (for example, Siri, Xiao Ai, and Celia) is added into many electronic devices to help the user complete the human-computer interaction process with the electronic device. An example in which Siri is used as the voice assistant is used. After the user wakes up Siri on the mobile phone, Siri may perform voice communication with the user by using a voice user interface (VUI). During voice communication, Siri may answer each query initiated by the user.

However, when the voice communication between the user and Siri is interrupted, for example, if an incoming call is suddenly received when the user has a dialog with Siri, the mobile phone automatically exits the current voice dialog with Siri. If the user expects to continue to perform voice communication with Siri, the user needs to wake up the voice assistant on the mobile phone again. In other words, after a dialog process between the user and the voice assistant on the mobile phone is interrupted, the voice assistant cannot resume the current voice dialog with the user, and consequently the voice assistant on the mobile phone is inefficient.

SUMMARY

This application provides a voice interaction method and an electronic device, so that after a dialog between a user and a voice assistant is interrupted, the voice assistant can resume the current dialog content with the user, to improve use efficiency and user experience of the voice assistant on the electronic device.

To achieve the foregoing objective, the following technical solutions are used in this application.

According to a first aspect, this application provides a voice interaction method, including: In response to an operation of waking up a voice assistant application by a user, an electronic device starts to run the voice assistant application in foreground, and displays a first interface. The first interface is used to display dialog content between the user and the voice assistant application. Further, the user can input voice to the electronic device. First voice input that is of the user and that is received by the electronic device is used as an example. The first voice input includes first slot information. If semantics of the first slot information is not clear, for example, if the first slot information is departure place information and a plurality of locations in a map are related to the departure place information, the electronic device may display a first card in the first interface in response to the first voice input. The first card includes N (N≥1) candidate options of the first slot information. The N candidate options are in a one-to-one correspondence with N query requests. Each query request in the N query requests carries a corresponding candidate option of the first slot information. In this way, when the user selects a candidate option (for example, a first candidate option) in the first card at any moment, the electronic device can send a first query request corresponding to the first candidate option to a first server, so that the first server updates the first slot information in the first voice input based on the first candidate option carried in the first query request, to provide a service result corresponding to the first voice input to the user. In other words, even if a dialog between the user and the voice assistant application is interrupted, after the electronic device displays the first card, because a correspondence is set between each candidate option in the first card and each query request, after the user selects a candidate option in the first card, the first server can support, based on a corresponding query request, the voice assistant to resume the current dialog content with the user. This improves use efficiency and user experience of the voice assistant on the electronic device.

In a possible implementation, after the electronic device displays the first card in the first interface, the method further includes: The electronic device may display a second interface of another application after the electronic device switches the voice assistant application running from foreground to background. In this case, the voice assistant application is not stopped (kill). Therefore, the electronic device may display the first interface again after the electronic device switches the voice assistant application running to foreground again, and the candidate options in the first card in the first interface are still valid.

In a possible implementation, the operation of selecting a first candidate option from the N candidate options may include: tapping the first candidate option in the first card, or inputting, to the electronic device, second voice input that includes the first candidate option. In other words, the user may select an option in the card by using the touch operation, or may select an option in the card through voice. In addition, either or both of the two interaction manners may be used in a plurality of rounds of dialogs. This improves an interaction mode and user experience when the user interacts with the voice assistant.

In a possible implementation, the first voice input may further include second slot information, for example, the second slot information is destination information. If semantics of the second slot information is not clear either, after the electronic device sends the first query request corresponding to the first candidate option to the first server, the method further includes: The electronic device displays a second card in the first interface. The second card includes M (M≥1) candidate options of the second slot information. The M candidate options are in a one-to-one correspondence with M query requests of the second slot information. The M query requests all carry the first candidate option selected by the user. Each query request in the M query requests carries a corresponding candidate option of the second slot information. In this case, after the user selects a second candidate option from the M candidate options at any moment, the electronic device may send a second query request corresponding to the second candidate option to the first server.

It may be learned that a query request corresponding to each candidate option in the second card carries the first slot information selected by the user in a previous dialog. Therefore, even if the dialog between the user and the voice assistant application is interrupted, when a mobile phone runs the voice assistant application in foreground again, the user can continue to select a candidate option of the second slot information in the second card, and does not need to input the selected first slot information to the voice assistant application. In this way, the user can continue to complete the interrupted dialog with the voice assistant application at any moment. This improves working efficiency and user experience of the voice assistant application on the mobile phone.

In a possible implementation, after the electronic device displays the second card in the first interface, the method further includes: The electronic device displays the second interface after the electronic device switches the voice assistant application running from foreground to background. The electronic device displays the first interface again after the electronic device switches the voice assistant application running to foreground again, and the candidate options in the second card in the first interface are still valid.

In a possible implementation, the operation of selecting a second candidate option from the M candidate options includes: tapping the second candidate option in the second card, or inputting, to the electronic device, third voice input that includes the second candidate option. In other words, the user may select an option in the card by using the touch operation, or may select an option in the card through voice. In addition, the two interaction manners may be mixed for use in a plurality of rounds of dialogs. This improves an interaction mode and user experience when the user interacts with the voice assistant.

In a possible implementation, after the electronic device receives the first voice input of the user, the method further includes: The electronic device sends the first voice input to the first server, so that the first server extracts the first slot information from the first voice input, obtains the N candidate options of the first slot information, and establishes the one-to-one correspondence between the N candidate options and the N query requests. The electronic device receives the one-to-one correspondence that is between the N candidate options and the N query requests and that is sent by the first server.

In a possible implementation, the first server may further extract the second slot information from the first voice input, obtain the M candidate options of the second slot information, and establish a one-to-one correspondence between the M candidate options and the M query requests. In this case, after the electronic device sends the first query request corresponding to the first candidate option to the first server, the method further includes: The electronic device receives the one-to-one correspondence that is between the M candidate options and the M query requests and that is sent by the first server.

In a possible implementation, after the electronic device displays the first card in the first interface, the method further includes: The electronic device receives fourth voice input of the user, where the fourth voice input includes a screening condition of the N candidate options. The electronic device displays a third card in the first interface in response to the fourth voice input, where the third card includes one or more candidate options that meet the screening condition, to help the user screen the options in the card.

According to a second aspect, this application provides a voice interaction method, including: A first server receives first voice input sent by an electronic device. The first server extracts first slot information from the first voice input. When semantics of the first slot information is not clear, the first server may obtain N (N≥1) candidate options of the first slot information, and establish a one-to-one correspondence between the N candidate options and N query requests. Each query request in the N query requests carries a corresponding candidate option of the first slot information. The first server may send the N candidate options to the electronic device, or the first server may send the correspondence between the N candidate options and the N query requests to the electronic device. After a user selects a first candidate option from the N candidate options on the electronic device, the electronic device may send the first candidate option to the first server. Further, the first server may update the first slot information in the first voice input based on a first query request corresponding to the first candidate option. The first server may determine a service result corresponding to the first voice input based on the updated first slot information. The first server records the correspondence between the N candidate options and the N query requests of the first slot information. Therefore, after the electronic device sends the first candidate option to the first server, the first server resumes current dialog content with the user. This improves use efficiency and user experience of the voice assistant on the electronic device.

In a possible implementation, the first voice input further includes second slot information. When semantics of the second slot information is not clear either, after the first server receives the first candidate option sent by the electronic device, the method further includes: The first server obtains M (M≥1) candidate options of the second slot information, and establishes a one-to-one correspondence between the M candidate options and M query requests. The M query requests all carry the first candidate option selected by the user. Each query request in the M query requests carries a corresponding candidate option of the second slot information. The first server sends the M candidate options to the electronic device. After the user selects a candidate option (for example, a second candidate option) from the M candidate options, the electronic device may send the second candidate option to the first server. Because a second query request corresponding to the second candidate option includes both the first slot information (namely, the first candidate option) selected by the user and the second slot information (namely, the second candidate option) selected by the user, the first server may update the first slot information and the second slot information in the first voice input based on the second query request. Further, the first server may determine the service result corresponding to the first voice input based on the updated first slot information and second slot information.

According to a third aspect, this application provides a voice interaction system, including: In response to an operation of waking up a voice assistant by a user, an electronic device starts to run the voice assistant application in foreground. The electronic device receives first voice input of the user. The electronic device sends the first voice input to a first server. The first server extracts first slot information from the first voice input. When semantics of the first slot information is not clear, the first server may obtain N (N≥1) candidate options of the first slot information, and establish a one-to-one correspondence between the N candidate options and N query requests. Each query request in the N query requests carries a corresponding candidate option of the first slot information. The first server may send the N candidate options to the electronic device. The electronic device displays a first card, where the first card includes the N candidate options of the first slot information. In response to an operation of selecting a first candidate option from the N candidate options by the user, the electronic device may send a first query request corresponding to the first candidate option to the first server, or the electronic device sends the first candidate option to the first server, so that the first server determines a first query request corresponding to the first candidate option. Further, the first server may update the first slot information in the first voice input based on the first query request, to determine a service result corresponding to the first voice input.

In a possible implementation, the first voice input further includes second slot information. When semantics of the second slot information is not clear either, after the electronic device sends the first query request corresponding to the first candidate option to the first server, the method further includes: The first server obtains M (M≥1) candidate options of the second slot information, and establishes a one-to-one correspondence between the M candidate options and M query requests. The M query requests all carry the first candidate option selected by the user. Each query request in the M query requests carries a corresponding candidate option of the second slot information. The first server sends the M candidate options to the electronic device. The electronic device displays a second card, where the second card includes the M candidate options of the second slot information.

In a possible implementation, after the electronic device displays the second card, the method further includes: In response to an operation of selecting a second candidate option from the M candidate options by the user, the electronic device sends a second query request corresponding to the second candidate option to the first server, or the electronic device sends the second candidate option to the first server, so that the first server determines a second query request corresponding to the second candidate option.

In a possible implementation, the voice interaction system further includes a second server, and the second server is configured to send the N candidate options of the first slot information and/or the M candidate options of the second slot information to the first server.

According to a fourth aspect, this application provides an electronic device, including: a touchscreen, a communications module, one or more processors, one or more memories, one or more microphones, and one or more computer programs. The processor is coupled to each of the touchscreen, the communications module, the microphone, and the memory. The one or more computer programs are stored in the memory. When the electronic device runs, the processor executes the one or more computer programs stored in the memory, so that the electronic device performs the voice interaction method according to any possible implementation.

According to a fifth aspect, this application provides a computer storage medium, including computer instructions. When the computer instructions are run on an electronic device, the electronic device is enabled to perform the voice interaction method according to any possible implementation of the first aspect.

According to a sixth aspect, this application provides a computer program product. When the computer program product runs on an electronic device, the electronic device is enabled to perform the voice interaction method according to any possible implementation of the first aspect.

It may be understood that the electronic device in the fourth aspect, the computer storage medium in the fifth aspect, and the computer program product in the sixth aspect that are provided above are all configured to perform the corresponding method provided above. Therefore, for beneficial effects that can be achieved by the electronic device, the computer storage medium, and the computer program product, refer to beneficial effects in the corresponding method provided above. Details are not described herein again.

BRIEF DESCRIPTION OF DRAWINGS

FIG. 6(a) and FIG. 6(b) are a schematic diagram 2 of a scenario of a voice interaction method according to an embodiment of this application;

FIG. 10(a) and FIG. 10(b) are a schematic diagram 6 of a scenario of a voice interaction method according to an embodiment of this application;

DESCRIPTION OF EMBODIMENTS

The following describes the implementations of the embodiments in detail with reference to accompanying drawings.

For example, a voice interaction method provided in the embodiment of this application may be applied to an electronic device that has a voice assistant function, for example, a mobile phone, a tablet computer, a notebook computer, an ultra-mobile personal computer (UMPC), a handheld computer, a netbook, a personal digital assistant (PDA), a wearable electronic device, and a virtual reality device. This is not limited in the embodiments of this application.

Figure 1:
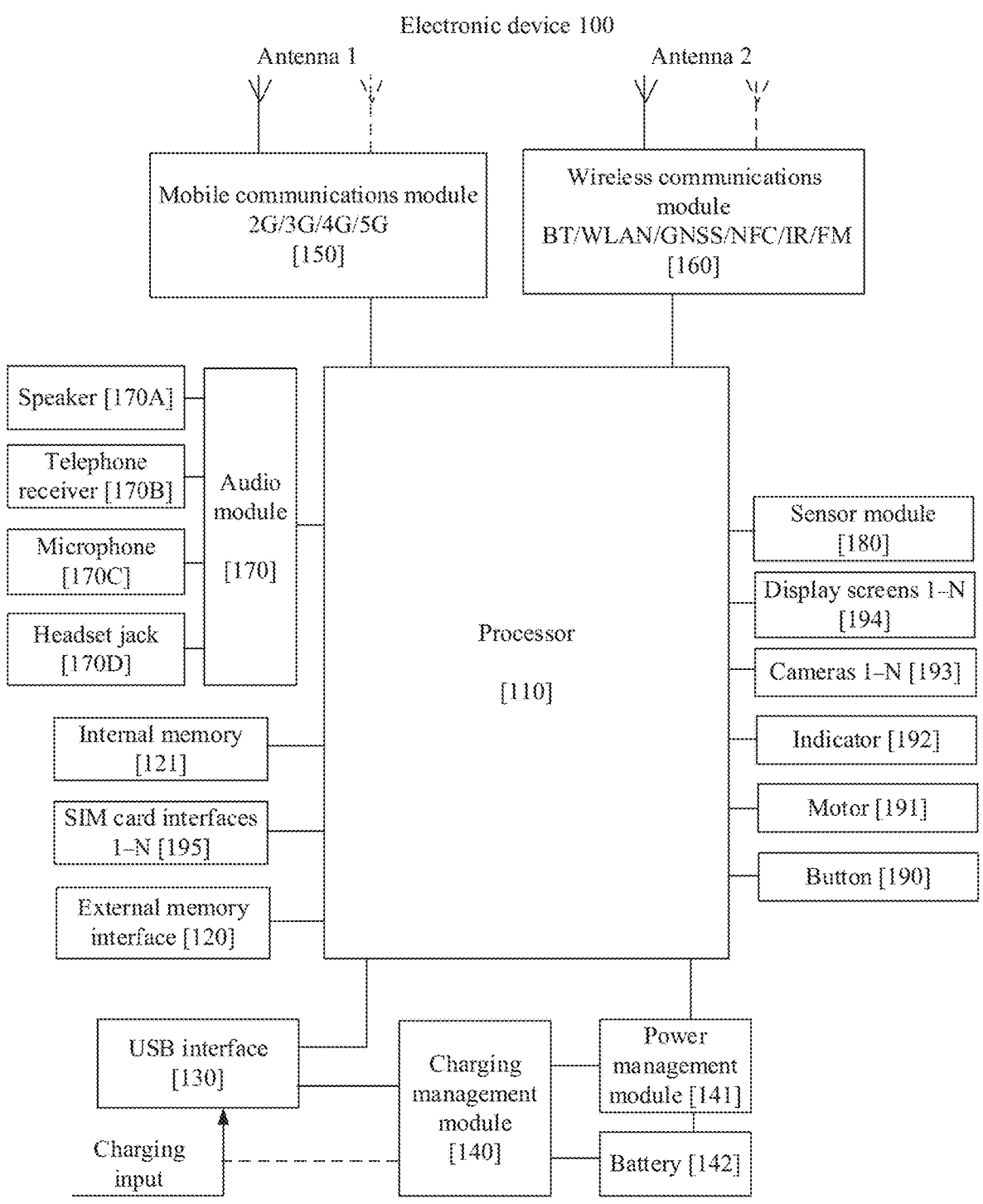
FIG. 1 is a schematic structural diagram 1 of an electronic device according to an embodiment of this application.

For example, FIG. 1 is a schematic structural diagram of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a button 190, a motor 191, an indicator 192, a camera 193, a display screen 194, a subscriber identity module (SIM) card interface 195, and the like.

It may be understood that the schematic structure in this embodiment of the present invention constitutes no specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a timing signal, to complete control of instruction reading and instruction execution.

A memory may be further disposed in the processor 110, to store instructions and data. In some embodiments, the memory in the processor 110 is a cache. The memory may store instructions or data that are or is just used or cyclically used by the processor 110. If the processor 110 needs to use the instructions or the data again, the processor 110 may directly invoke the instructions or the data from the memory, to avoid repeated access, and reduce waiting time of the processor 110. This improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 through the I2S interface, to answer a call by using a Bluetooth headset.

The PCM interface may be also used for audio communication, to perform sampling, quantization, and encoding on an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to answer a call by using a Bluetooth headset. Both the I2S interface and the PCM interface may be used for audio communication.

The UART interface is a universal serial data line, and is used for asynchronous communication. The bus may be a two-way communications bus. The UART interface switches to-be-transmitted data between serial communication and parallel communication. In some embodiments, the UART interface is usually configured to connect the processor 110 and the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to play music by using a Bluetooth headset.

The MIPI interface may be configured to connect the processor 110 and a peripheral component such as the display screen 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display screen 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 and the camera 193, the display screen 194, the wireless communications module 160, the audio module 170, the sensor module 180, and the like. The GPIO interface may be further configured as an I2C interface, an I2S interface, a UART interface, an MIPI interface, or the like.

It may be understood that an interface connection relationship between the modules that is illustrated in this embodiment of the present invention is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from the charger. The charger may be a wireless charger, or may be a wired charger. In some embodiments in which the charger is a wired charger, the charging management module 140 may receive charging input from the wired charger through the USB interface 130. In some embodiments in which the charger is a wireless charger, the charging management module 140 may receive charging input from the wireless charger by using a wireless charging coil of the electronic device 100. When charging the battery 142, the charging management module 140 may further supply power to the electronic device by using the power management module 141.

The power management module 141 is configured to connect the battery 142, the charging management module 140, and the processor 110. The power management module 141 may receive input of the battery 142 and/or the charging management module 140, to supply power to the processor 110, the internal memory 121, the display screen 194, the camera 193, the wireless communications module 160, and the like.

The power management module 141 may be configured to monitor performance parameters such as a battery capacity, a battery cycle count, battery charging voltage, battery discharging voltage, and a battery state of health (for example, current leakage or impedance). In some other embodiments, the power management module 141 may be alternatively disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna of the electronic device 100 may be configured to cover one or more communication frequency bands. Different antennas may be further multiplexed to improve utilization of the antennas. For example, the antenna 1 may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the electronic device 100. The mobile communications module 150 may include one or more filters, a switch, a power amplifier, a low noise amplifier (LNA), and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same component.

The modem processor may include a modulator and a demodulator. The modulator is configured to modulate a to-be-sent low-frequency baseband signal into an intermediate/high-frequency signal. The demodulator is configured to demodulate a received electromagnetic wave signal into a low-frequency baseband signal. Subsequently, the demodulator transmits the low-frequency baseband signal obtained through demodulation to the baseband processor for processing. After the low-frequency baseband signal is processed by the baseband processor, the low-frequency baseband signal is transmitted to the application processor. The application processor outputs a sound signal by using an audio device (which is not limited to the speaker 170A, the telephone receiver 170B, and the like), or displays an image or a video by using the display screen 194. In some embodiments, the modem processor may be an independent component. In some other embodiments, the modem processor may be independent of the processor 110, and is disposed in a same component as the mobile communications module 150 or another functional module.

The wireless communications module 160 may provide a solution to wireless communication applied to the electronic device 100, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communications module 160 may be one or more components into which one or more communication processing modules are integrated. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communications module 150 of the electronic device 100 are coupled, and the antenna 2 and the wireless communications module 160 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), a BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 100 implements a display function by using the GPU, the display screen 194, the application processor, and the like. The GPU is a microprocessor for image processing, and connects the display screen 194 and the application processor. The GPU is configured to perform mathematical and geometrical calculation, and is configured to perform graphics rendering. The processor 110 may include one or more GPUs that execute program instructions to generate or change display information.

The display screen 194 is configured to display an image, a video, and the like. The display screen 194 includes a display panel. The display panel may use a liquid crystal display (LCD), an organic light-emitting diode (OLED), an active-matrix organic light emitting diode (AMOLED), a flexible light-emitting diode (FLED), a miniLED, a microLED, a micro-OLED, a quantum dot light emitting diode (QLED), and the like. In some embodiments, the electronic device 100 may include one or N display screens 194, and N is a positive integer greater than 1.

The electronic device 100 may implement the photographing function by using the ISP, the camera 193, the video codec, the GPU, the display screen 194, the application processor, and the like.

The ISP is configured to process data sent by the camera 193. For example, during photographing, a shutter is pressed, light is transferred to a photosensitive element of the camera by using a lens, and an optical signal is converted into an electrical signal. The photosensitive element of the camera transmits the electrical signal to the ISP for processing, to convert the electrical signal into an image visible to the eyes. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a still image or a video. In some embodiments, the mobile phone 100 may include one or N cameras, and N is a positive integer greater than 1. The camera 193 may be a front-facing camera, or may be a rear-facing camera.

The digital signal processor is configured to process a digital signal, and may further process another digital signal in addition to a digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)1, MPEG2, MPEG3, and MPEG4.

The NPU is a neural-network (NN) computing processor, and quickly processes input information by using a biological neural network structure such as a transmission mode between human-brain neurons, and may further constantly perform self-learning. The NPU may be used to implement application such as intelligent cognition of the electronic device 100, for example, image recognition, facial recognition, voice recognition, and text understanding.

The external memory interface 120 may be configured to connect to an external storage card such as a micro SD card, to expand a storage capability of the electronic device 100. The external storage card communicates with the processor 110 by using the external storage interface 120, to implement a data storage function, for example, to store a file such as music or a video into the external storage card.

The internal memory 121 may be configured to store one or more computer programs. The one or more computer programs include instructions. The processor 110 may run the instructions stored in the internal memory 121, so that the electronic device 100 performs the intelligent contact recommendation method provided in some embodiments of this application, various function applications, data processing, and the like. The internal memory 121 may include a program storage area and a data storage area. The program storage area may store an operating system. The program storage area may further store one or more application programs (such as gallery or contacts). The data storage area may store data (for example, a photo and a contact) and the like created in a process of using the electronic device 101.

In addition, the internal memory 121 may include a high-speed random access memory, and may further include a non-volatile memory such as one or more magnetic disk memories, a flash memory, or a universal flash storage (UFS), and the like. In some other embodiments, the processor 110 runs the instructions stored in the internal memory 121 and/or the instructions stored in the memory disposed in the processor, so that the electronic device 100 performs the intelligent number recommendation method provided in the embodiments of this application, various function applications, and data processing.

The electronic device 100 may implement an audio function such as music playing or recording by using the audio module 170, the speaker 170A, the telephone receiver 170B, the microphone 170C, the headset jack 170D, the application processor, and the like.

The audio module 170 is configured to convert digital audio information into analog audio signal output, and is further configured to convert analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a hands-free call by using the speaker 170A.

The telephone receiver 170B, also referred to as a "receiver", is configured to convert an audio electrical signal into a sound signal. When the electronic device 100 is used to answer a call or receive voice information, the telephone receiver 170B may be put close to the ear, to receive voice.

The microphone 170C, also referred to as "mic" or "mike", is configured to convert a sound signal into an electrical signal. When making a call or sending voice information, a user may produce sound with the mouth approaching the microphone 170C, to input a sound signal to the microphone 170C. One or more microphones 170C may be disposed in the electronic device 100. In some other embodiments, two microphones 170C may be disposed in the electronic device 100, to implement a noise reduction function in addition to collecting a sound signal. In some other embodiments, three, four, or more microphones 170C may be alternatively disposed in the electronic device 100, to recognize a sound source, implement a directional recording function, and the like in addition to collecting a sound signal and implementing noise reduction.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The sensor 180 may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like. This is not limited in this embodiment of this application.

Certainly, the electronic device 100 provided in this embodiment of this application may further include one or more components such as the button 190, the motor 191, the indicator 192, and the SIM card interface 195. This is not limited in this embodiment of this application.

A software system of the electronic device 100 may use a hierarchical architecture, an event-driven architecture, a microkernel architecture, a micro service architecture, or a cloud architecture. In this embodiment of this application, the software structure of the electronic device 100 is described by using an Android system with a hierarchical architecture as an example.

Figure 2:
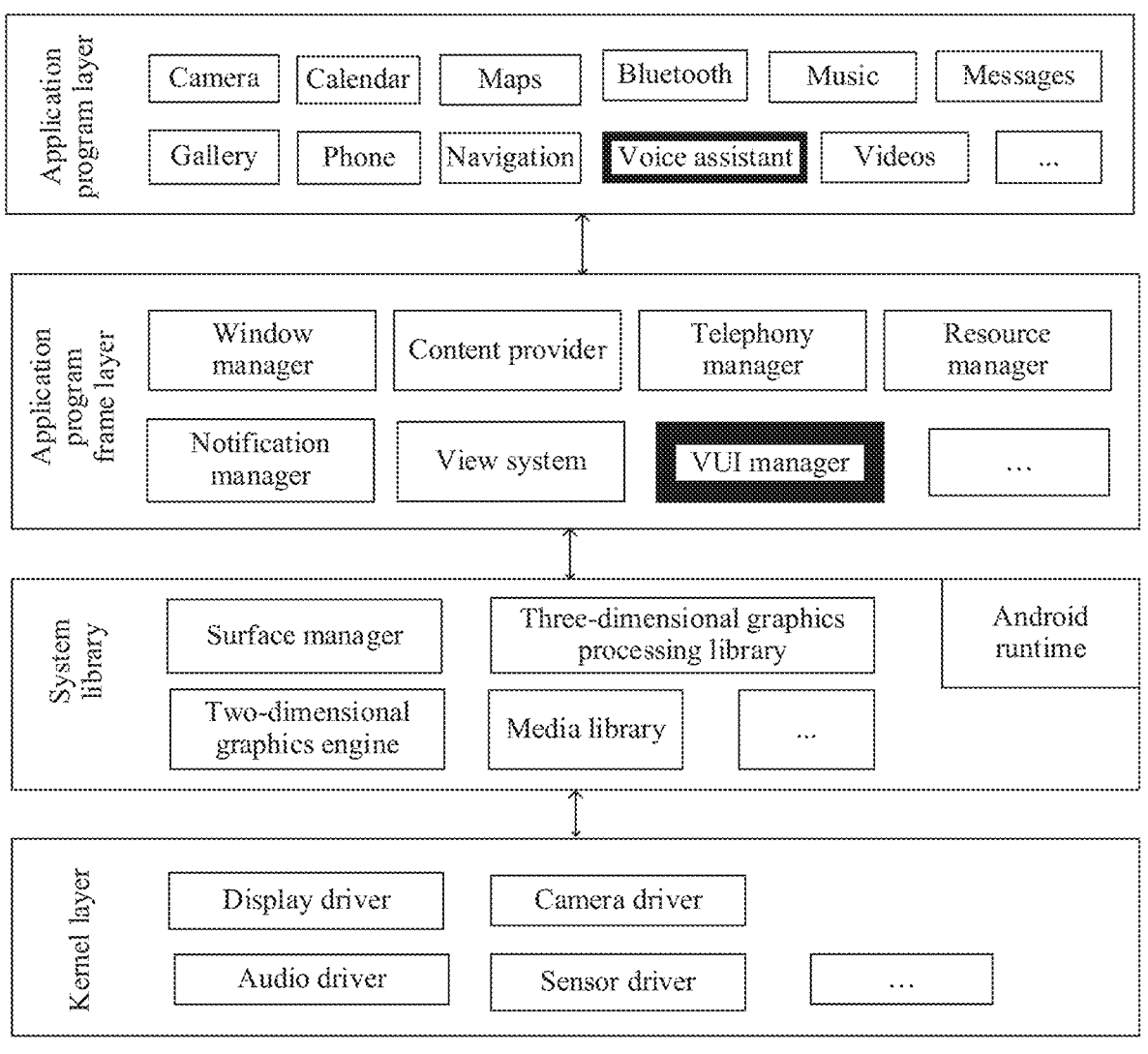
FIG. 2 is a schematic architectural diagram of an operating system of an electronic device according to an embodiment of this application.

FIG. 2 is a block diagram of the software structure of the electronic device 100 in this embodiment of this application.

In the hierarchical architecture, software is divided into several layers, and each layer has a clear role and task. Layers communicate with each other by using a software interface. In some embodiments, the Android system is divided into four layers that are respectively an application program layer, an application program framework layer, an Android runtime (Android runtime) and a system library, and a kernel layer from top to bottom.

The application program layer may include a series of application program packages.

As shown in FIG. 2, the application program packages may include apps (application, application) such as phone, notes, browser, contacts, camera, gallery, calendar, maps, Bluetooth, music, videos, and messages.

In this embodiment of this application, the application program layer may further include a voice assistant app. For example, a user may refer to the voice assistant app as Siri, Celia, or Xiao Ai.

After the voice assistant app is enabled, the voice assistant app may collect voice input of the user, and convert the voice input into a corresponding voice task. Further, the voice app may invoke an interface of a related application to complete the voice task, so that the user implements control of the electronic device through voice.

The application program framework layer provides an application programming interface (API) and a programming framework for an application program at the application program layer. The application program framework layer includes some predefined functions.

As shown in FIG. 2, the application program framework layer may include a window manager, a content provider, a view system, a telephony manager, a resource manager, a notification manager, and the like.

The window manager is configured to manage a window program. The window manager may obtain a size of a display screen, determine whether there is a status bar, lock the screen, capture the screen, and the like.

The content provider is configured to store and obtain data, so that the data can be accessed by an application program. The data may include a video, an image, audio, calls that are made and answered, a browsing history and bookmarks, a phone book, and the like.

The view system includes a visual control such as a control for text display or a control for picture display. The view system may be configured to construct an application program. A display interface may include one or more views. For example, a display interface including an SMS message notification icon may include a view for text display and a view for picture display.

The telephony manager is configured to provide a communication function of the electronic device 100, for example, manage a call status (including answering, disconnecting, and the like).

The resource manager provides various resources for an application program, for example, a localized character string, an icon, a picture, a layout file, and a video file.

The notification manager enables an application program to display notification information on the status bar, and may be configured to transfer a message of a notification type. The message may automatically disappear after a short stay without interaction with the user. For example, the notification manager is configured to notify download completion, provide a message prompt, and the like. The notification manager may further be a notification that appears on a top status bar of the system in a form of a graph or a scroll bar text, for example, a notification of an application program running in background, or may further be a notification that appears on the screen in a form of a dialog window. For example, text information is prompted on the status bar, a prompt tone is made, the electronic device vibrates, or an indicator light flashes.

In this embodiment of this application, the application program framework layer further includes a VUI (voice user interface) manager. The VUI manager may monitor a running status of the voice assistant app, or may serve as a bridge between the voice assistant app and another app, to transfer a voice task obtained by the voice assistant app to a related app for execution.

Figures 3A, 3B:
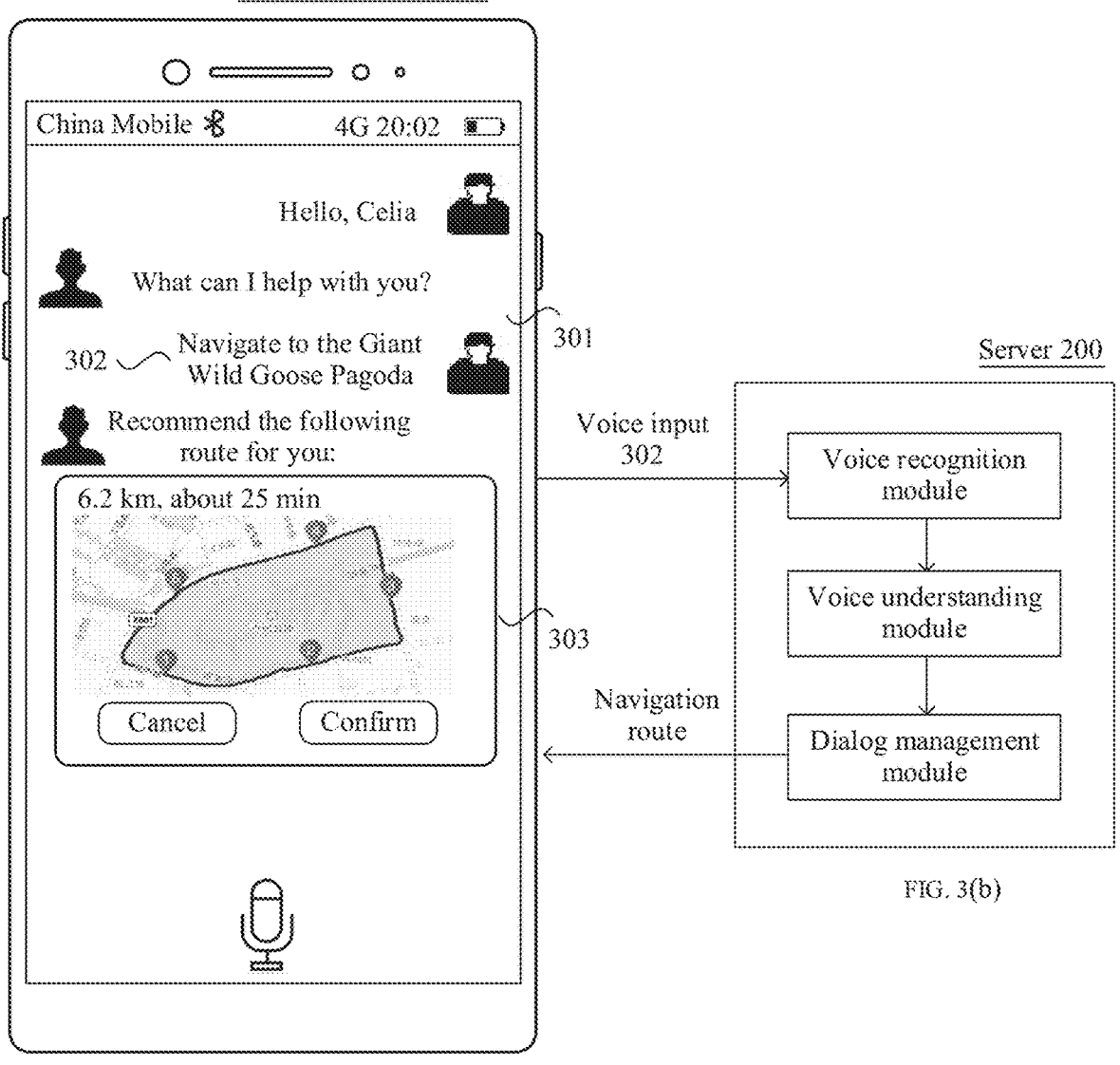
FIG. 3(a) and FIG. 3(b) are a schematic architectural diagram of a voice interaction system according to an embodiment of this application.

For example, the electronic device 100 may detect voice input of the user by using a microphone. If the electronic device detects that the user inputs wakeup voice "hello, Celia", the VUI manager may enable the voice assistant app at the application program layer. In this case, as shown in FIG. 3(*a*), the electronic device 100 may display a dialog interface 301 of the voice assistant app. The electronic device 100 may display dialog content between the user and the voice assistant app in the dialog interface 301.

Still as shown in FIG. 3(*a*), after the user wakes up the voice assistant app, the voice assistant app may continue to detect voice input of the user over the microphone. An example in which current voice input 302 is "navigate to the Giant Wild Goose Pagoda" is used. The voice assistant app may display text information corresponding to the voice input 302 in the dialog interface 301. In addition, the voice assistant app may send the voice input 302 to a server 200, and the server 200 recognizes and responds to the current voice input 302.

As shown in FIG. 3(*b*), the server 200 may include a voice recognition module, a voice understanding module, and a dialog management module. After receiving the current voice input 302, the server 200 may first convert the voice input 302 into corresponding text information by using the voice recognition module. Further, the voice understanding module in the server 200 may extract user intent and slot information from the text information according to a natural language understanding (NLU) algorithm. For example, the user intent in the voice input 302 is navigation, and the slot information in the voice input 302 is the Giant Wild Goose Pagoda. In this case, the dialog management module may request corresponding service content from a server of a related third-party application based on the extracted user intent and slot information. For example, the dialog management module may request, from a server of a Baidu map app, a navigation service whose a destination is the Giant Wild Goose Pagoda. In this way, the server of the Baidu map app may send, to the server 200, a navigation route whose destination is the Giant Wild Goose Pagoda, and the server 200 may send the navigation route to the electronic device 100. Still as shown in FIG. 3(*a*), the voice assistant app on the electronic device 100 may display the navigation route in the dialog interface 301 in a form of a card 303 or the like, so that the voice assistant app completes a response to the current voice input 302.

Figure 4:
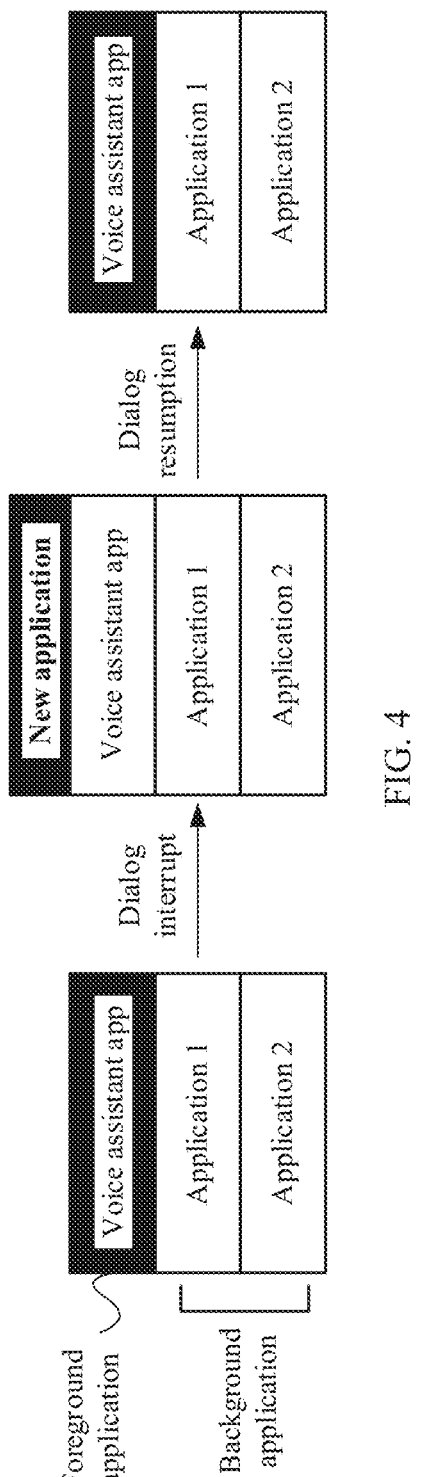
FIG. 4 is a schematic diagram 1 of a scenario of a voice interaction method according to an embodiment of this application.

In this embodiment of this application, as shown in FIG. 4, when the user has a dialog with the voice assistant app in the dialog interface 301, the voice assistant app is used as a foreground application to present corresponding visual output to the user by using the display screen 194. If the electronic device 100 detects that another event interrupts the dialog, for example, an incoming call event or another application is opened by the user, the electronic device 100 may switch the voice assistant app that originally runs in foreground to background to continue to run the app, and run, in foreground, a new application that interrupts the dialog. When the voice assistant app is switched to background, the voice assistant app does not provide, to the user, visual output related to the voice assistant app, and the user cannot interact with the voice assistant app.

When the user wakes up the voice assistant app again or the user exits from the new application, still as shown in FIG. 4, the electronic device 100 may switch the voice assistant app to foreground again, to continue to display the dialog interface 301 and historical dialog content in the dialog interface 301. The dialog interface 301 shown in FIG. 3(*a*) is still used as an example. After the voice assistant app is switched from background to foreground, the electronic device 100 may continue to display the dialog interface 301, and the user may continue to operate an option in the card 303 in the dialog interface 301, to resume the previous voice input 302 for a next dialog. Therefore, the voice input "navigate to the Giant Wild Goose Pagoda" does not need to be input again. This improves use efficiency and user experience of the voice assistant app on the electronic device 100.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem, and provides fusion of 2D and 3D layers for a plurality of application programs. The media library supports playing and recording of a plurality of common audio and video formats, a still image file, and the like. The media library may support a plurality of audio/video coding formats, for example, MPEG4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

The Android runtime includes a core library and a virtual machine. The Android runtime is responsible for scheduling and managing the Android system.

The core library includes two parts: One part is a functional function that needs to invoked in a Java language, and the other part is an Android core library.

The application program layer and the application program framework layer are run on the virtual machine. The virtual machine executes Java files of the application program layer and the application program framework layer as binary files. The virtual machine is configured to execute functions such as object lifecycle management, stack management, thread management, security and exception management, and garbage collection.

The kernel layer is a layer between hardware and software. The kernel layer includes at least a display driver, a camera driver, an audio driver, a sensor driver, and the like. This is not limited in this embodiment of this application.

To facilitate a clear understanding of the following embodiments, brief descriptions of related technologies are first provided.

User intent (intent): Each piece of voice input of the user corresponds to intent of the user, and the intent is a set of a plurality of sentence expressions. For example, "I want to watch a movie" and "I want to watch an action movie filmed by Andy Lau in 2001" may both belong to same video playing intent.

Slot information: The slot information is key information that is in voice input of the user and that is used to express intent. The slot information directly determines whether correct intent can be matched for the electronic device (or the server). A slot corresponds to a keyword of a type of attribute, and information in the slot may be filled by using keywords of a same type. For example, a query (query) sentence corresponding to song playing intent is "I want to listen to {song} of {singer}", where {singer} is a singer slot, and {song} is a song slot. In this case, if receiving voice input "I want to listen to Red Bean of Faye Wong" sent by the user, the electronic device (or the server) may determine, through extraction from the voice input, that information in the {singer} slot is Faye Wong and information in the {song} slot is Red Bean. In this way, the electronic device (or the server) may recognize, based on the two slot information, that user intent of the current voice input is to play the song Red Bean of Faye Wong.

With reference to the accompanying drawings, the following describes in detail the voice interaction method provided in the embodiments of this application. In the following embodiments, an example in which a mobile phone is used as the electronic device 100 is used for description.

Figure 5A:
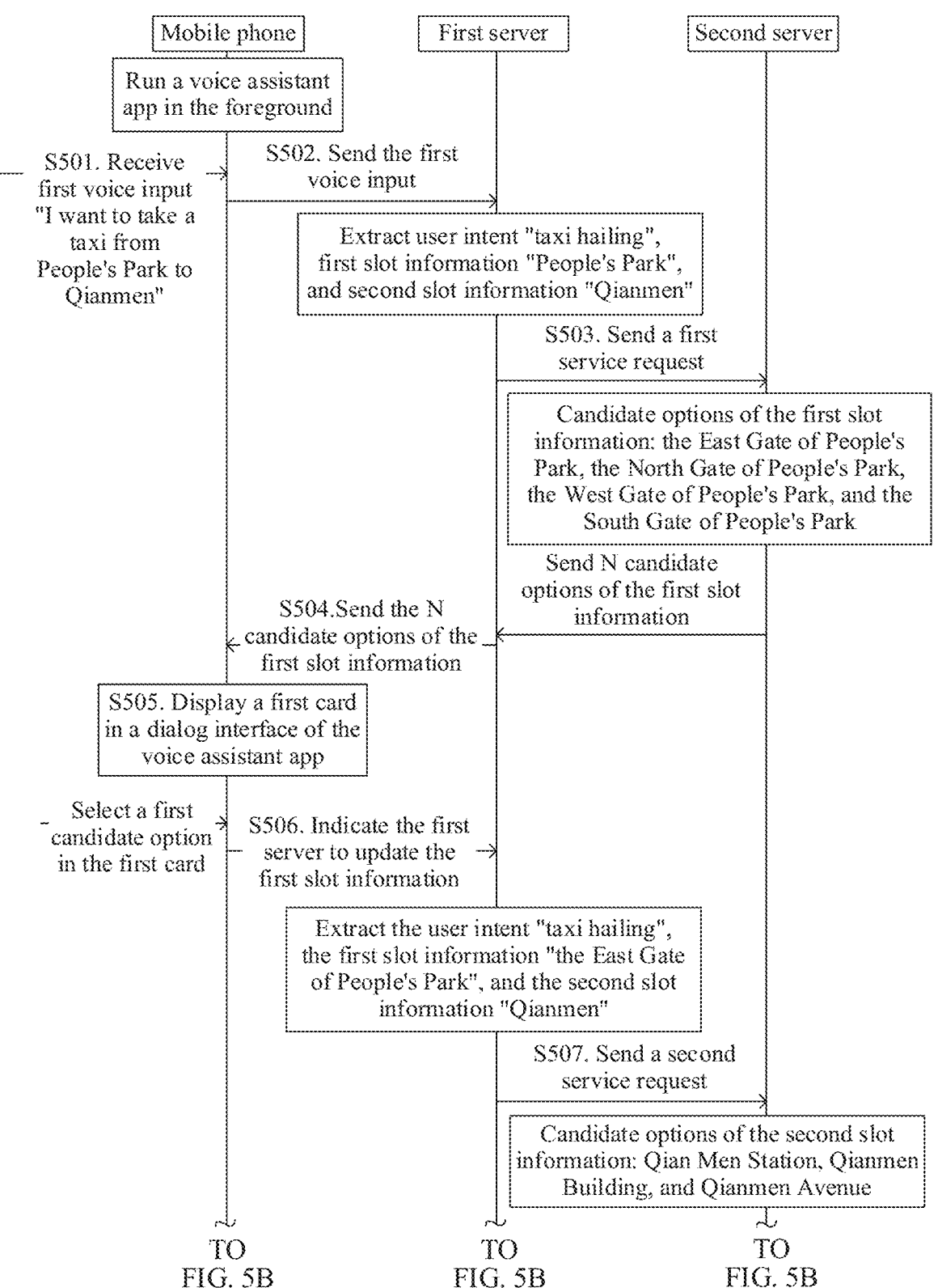
FIG. 5A and FIG. 5B are a schematic interaction diagram of a voice interaction method according to an embodiment of this application.
Figure 5B:
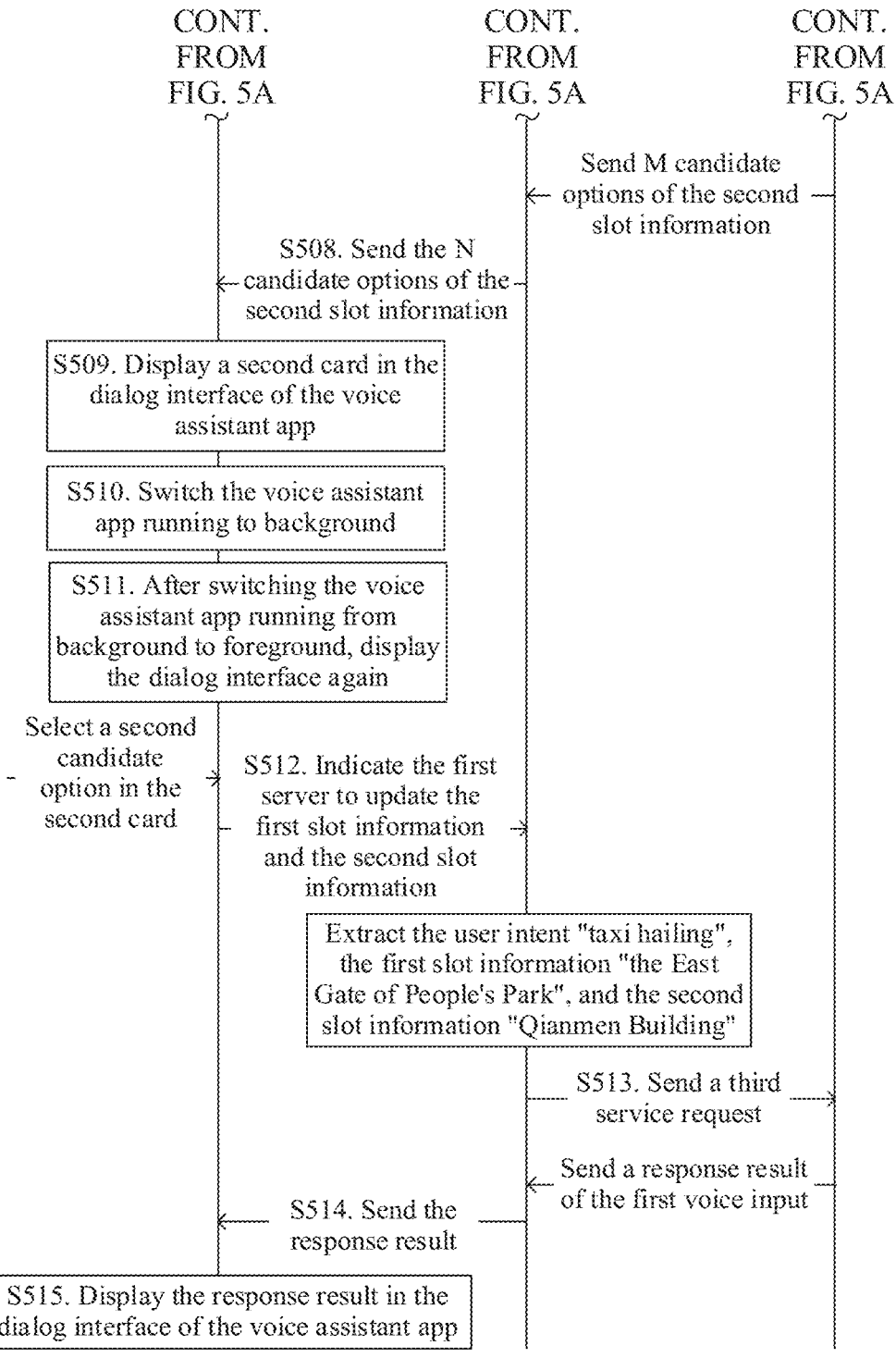

FIG. 5A and FIG. 5B are a schematic flowchart of a voice interaction method according to an embodiment of this application. As shown in FIG. 5A and FIG. 5B, the voice interaction method may include the following steps.

S501. When running a voice assistant app in foreground, a mobile phone receives first voice input of a user.

For example, when the user expects to have a dialog with the voice assistant on the mobile phone, the user may input wakeup voice including a wakeup keyword, to trigger the mobile phone to start to run the voice assistant app in foreground. For example, after detecting that the user inputs wakeup voice "hello, Celia", the mobile phone may open the voice assistant app in foreground, and display a dialog interface of the voice assistant app. As shown in FIG. 6(*a*), the mobile phone may display a dialog interface 601 of the voice assistant app in full screen mode, and dialog content between the user and the voice assistant "Celia" may be displayed in real time in the dialog interface 601. Alternatively, the mobile phone may display the dialog interface of the voice assistant app in floating window mode. As shown in FIG. 6(*b*), the mobile phone may display dialog content between the user and the voice assistant "Celia" in real time in a floating window 602.

Certainly, in addition to using the wakeup voice to open the voice assistant app on the mobile phone, the user may further use a preset gesture or a button to wake up the mobile phone to run the voice assistant app in foreground. This is not limited in this embodiment of this application.

The dialog interface 601 shown in FIG. 6(*a*) is used as an example. After the mobile phone starts to run the voice assistant app in foreground, a voice collection button 603 is disposed in the dialog interface 601. If the mobile phone detects that the user taps the voice collection button 603, the voice assistant app may collect voice input (namely, the first voice input) of the user by invoking a microphone on the mobile phone. For example, first voice input 604 that is input by the user to the mobile phone is "I want to take a taxi from People's Park to Qianmen". Alternatively, after displaying the dialog interface 601 of the voice assistant app, the mobile phone may automatically enable the microphone to collect the first voice input of the user. This is not limited in this embodiment of this application.

S502. The mobile phone sends the first voice input to a first server, so that the first server extracts user intent and slot information from the first voice input, where the first voice input includes a first slot and a second slot.

The first voice input 604 is still used as an example. After receiving the first voice input 604 "I want to take a taxi from People's Park to Qianmen" sent by the user, the mobile phone may send the first voice input 604 to the first server for voice recognition and understanding, to extract user intent and slot information from the first voice input 604.

For example, after receiving the first voice input 604 sent by the mobile phone, the first server may convert the first voice input 604 into corresponding text information according to a voice recognition algorithm, namely, "I want to take a taxi from People's Park to Qianmen". Further, the first server may extract the user intent and the slot information from the text information of the first voice input 604 according to a preset NLU algorithm. In this embodiment of this application, the first voice input that is input by the user includes a plurality of pieces of slot information. For example, the first voice input 604 includes two slots: One slot is a departure place slot (namely, the first slot) during taxi hailing, and the other slot is a destination slot (namely, the second slot) during taxi hailing. In this case, the first server may determine, through extraction form "I want to take a taxi from People's Park to Qianmen", that slot information (namely, first slot information) in the first slot is People's Park and slot information (namely, second slot information) in the second slot is Qianmen. In addition, the first server may determine, through extraction form "I want to take a taxi from People's Park to Qianmen", that the user intent corresponding to the first voice input 604 is taxi hailing.

In addition, the first server may store content of a dialog performed between the user and the voice assistant app each time, and generate a dialog record between the user and the voice assistant app. For example, the first server may set a size of a stored dialog record to a specific size. In this case, when the dialog record between the user and the voice assistant app exceeds a preset size, the mobile phone may delete earliest dialog content. For another example, the first server may set storage of the dialog record between the user and the voice assistant app within a specific time period. If the first server does not receive new voice input within a preset time period, the first server may delete a current dialog record.

S503. The first server requests, based on the user intent and the slot information, a second server to respond to the first voice input.

The first voice input 604 is still used as an example. After the first server determines, through extraction from the first voice input 604, that the user intent is taxi hailing, the first slot information is People's Park, and the second slot information is Qianmen, the first server may determine a third-party app (for example, a Didi Taxi app) corresponding to the user intent "taxi hailing". Further, the first server may send a first service request to a server (namely, the second server) of the Didi Taxi app. The first service request includes the user intent, the first slot information, and the second slot information that are extracted by the first server.

After the second server receives the first service request sent by the first server, the second server may determine, based on the user intent, that the user needs to use a taxi hailing service. Further, the second server may determine specific addresses of a departure place and a destination based on the first slot information and the second slot information.

If the second server finds a plurality of addresses associated with the first slot information (namely, People's Park), it indicates that the departure place that is input by the user in the first voice input 604 is not accurate. To continue to provide the current taxi hailing service to the user, the second server may send, to the first server as candidate options, the plurality of found addresses associated with the first slot information (namely, People's Park). For example, the candidate options include a detailed address of the North Gate of People's Park, a detailed address of the East Gate of People's Park, a detailed address of the West Gate of People's Park, and a detailed address of the South Gate of People's Park.

S504. After receiving N candidate options that are of the first slot information and that are sent by the second server, the first server sends the N candidate options to the mobile phone.

An example in which the server of the Didi Taxi app is the second server is still used. After the first server receives the N candidate options that are of the departure place information (namely, the first slot information) and that are sent by the server of the Didi Taxi app, the first server may establish a correspondence between each candidate option in the N candidate options and a corresponding query request. Each query request includes a corresponding candidate option.

For example, it may be preset that each query request includes a taxi hailing sentence template corresponding to a candidate option. The taxi hailing sentence template is text content that has a fixed sentence pattern and that is associated with the user intent in the first voice input. For example, a taxi hailing sentence template associated with the taxi hailing intent is "take a taxi from {first slot information} to {second slot information}". Because the N candidate options are candidate options of the first slot information, query requests corresponding to the N candidate options each include a corresponding taxi hailing sentence template, and first slot information in the taxi hailing sentence template is a corresponding candidate option.

For example, a first candidate option of the first slot information is the detailed address of the North Gate of People's Park, and the first candidate option corresponds to a first query request. The first query request may include a first taxi hailing sentence template, and the first taxi hailing sentence template is: "take a taxi from {the North Gate of People's Park} to {Qianmen}". In the first taxi hailing sentence template, the first slot information changes from {People's Park} to {the North Gate of People's Park}.

For example, a second candidate option of the first slot information is the detailed address of the South Gate of People's Park, and the second candidate option corresponds to a second query request. The second query request may include a second taxi hailing sentence template, and the second taxi hailing sentence template is: "take a taxi from {the South Gate of People's Park} to {Qianmen}". In the second taxi hailing sentence template, the first slot information changes from {People's Park} to {the South Gate of People's Park}.

For example, a third candidate option of the first slot information is the detailed address of the West Gate of People's Park, and the third candidate option corresponds to a third query request. The third query request may include a third taxi hailing sentence template, and the third taxi hailing sentence template is: "take a taxi from {the West Gate of People's Park} to {Qianmen}". In the third taxi hailing sentence template, the first slot information changes from {People's Park} to {the West Gate of People's Park}.

For example, a fourth candidate option of the first slot information is the detailed address of the East Gate of People's Park, and the fourth candidate option corresponds to a fourth query request. The fourth query request may include a fourth taxi hailing sentence template, and the fourth taxi hailing sentence template is: "take a taxi from {the East Gate of People's Park} to {Qianmen}". In the fourth taxi hailing sentence template, the first slot information changes from {People's Park} to {the East Gate of People's Park}.

In some embodiments, the first server may update the first slot information in the first voice input to a corresponding candidate option, and then add the updated first slot information into a query request. For example, the first voice input 604 is "I want to take a taxi from People's Park to Qianmen". When the first candidate option is the North Gate of People's Park, the first server may update the first voice input 604 to "I want to take a taxi from the North Gate of People's Park to Qianmen", and add the updated first voice input 604 into the first query request corresponding to the first candidate option. When the second candidate option is the South Gate of People's Park, the first server may update the first voice input 604 to "I want to take a taxi from the South Gate of People's Park to Qianmen", and add the updated first voice input 604 into the second query request corresponding to the second candidate option. When the third candidate option is the West Gate of People's Park, the first server may update the first voice input 604 to "I want to take a taxi from the West Gate of People's Park to Qianmen", and add the updated first voice input 604 into the third query request corresponding to the third candidate option. When the fourth candidate option is the East Gate of People's Park, the first server may update the first voice input 604 to "I want to take a taxi from the East Gate of People's Park to Qianmen", and add the updated first voice input 604 into the fourth query request corresponding to the fourth candidate option.

Further, the first server may send the four candidate options of the first slot information to the mobile phone, or the first server may send the four candidate options of the first slot information and corresponding query requests to the mobile phone, to help the user subsequently select accurate departure place information to complete the taxi hailing service.

Certainly, in addition to the plurality of specific addresses (namely, the N candidate options) of People's Park, the server of the Didi Taxi app may further send related information of the candidate options to the first server, for example, information such as a distance between each specific address and a current location of the user, a rating of the user for each specific address, and an open time of each specific address. In this case, the first server may send the information to the mobile phone together.

S505. The mobile phone displays a first card in the dialog interface of the voice assistant app, where the first card includes the N candidate options.

After receiving the N candidate options that are of the first slot information and that are sent by the first server, the mobile phone may display the N candidate options to the user in the dialog interface 601 of the voice assistant app in a form of a card or the like for selection by the user.

Figure 7:
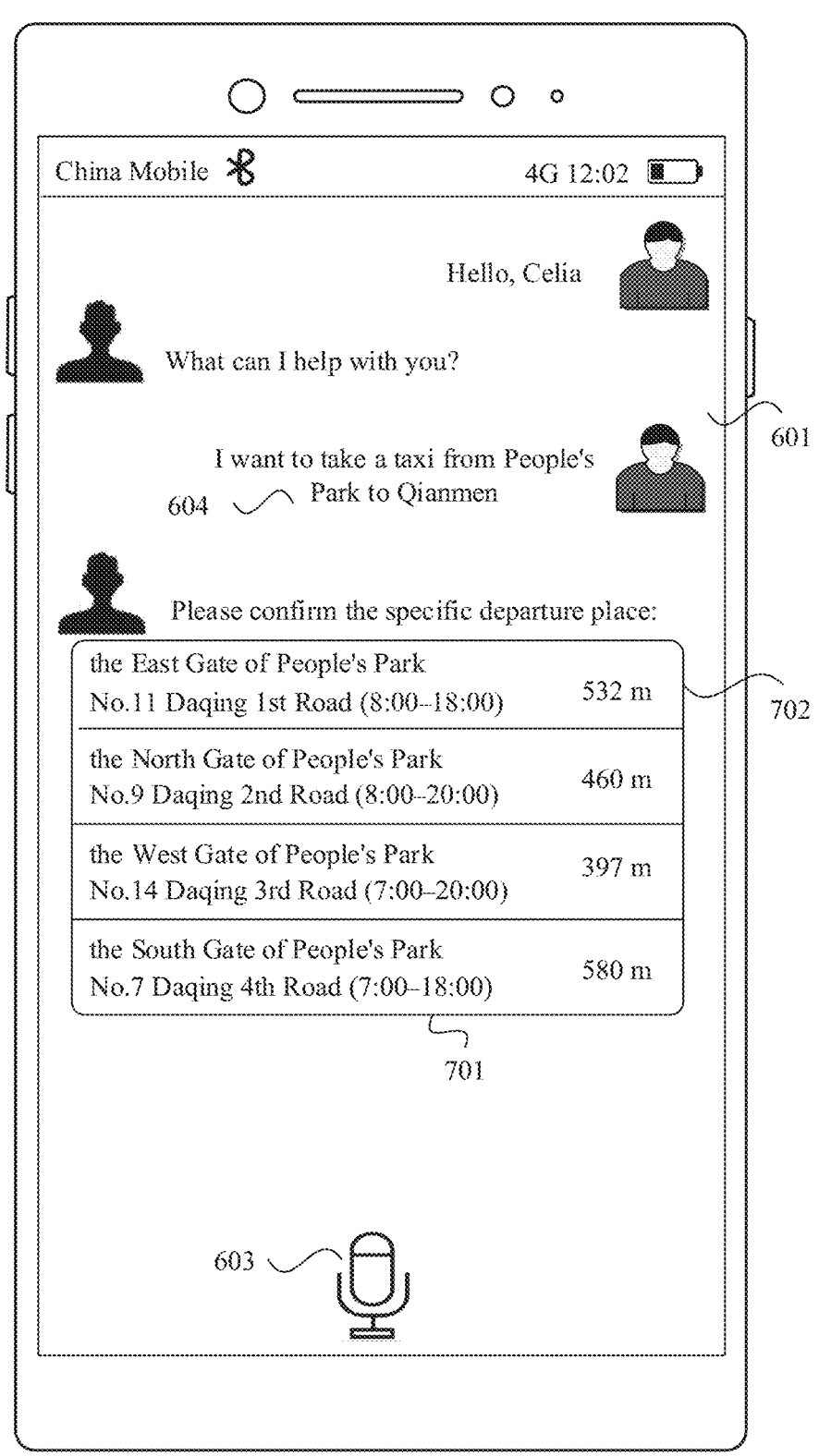
FIG. 7 is a schematic diagram 3 of a scenario of a voice interaction method according to an embodiment of this application.

For example, as shown in FIG. 7, after receiving the four candidate options that are of the first slot information and that are sent by the first server, the mobile phone may load, through JS (JavaScript) rendering, a first card 701 in the dialog interface 601 that is currently displayed in foreground. The first card 701 includes the four pieces of specific departure place information that is related to People's Park and that is found by the server of the Didi Taxi app, namely, the detailed address of the North Gate of People's Park, the detailed address of the East Gate of People's Park, the detailed address of West Gate of People's Park, and the detailed address of the South Gate of People's Park. The pieces of departure information are also the candidate options of the first slot information in the first voice input 604.

Still as shown in FIG. 7, a first candidate option 702 in the first card 701 is used as an example, and a specific name of the first candidate option 702 is "the East Gate of People's Park". The mobile phone may further display a specific address of the East Gate of People's Park in the first candidate option 702, for example, No. 11 Daqing 1st Road. The mobile phone may further display, in the first candidate option 702, a distance of 560 meters between the East Gate of People's Park and the current location of the user and an opening time 8:00 to 18:00 of the East Gate of People's Park.

In addition, if the first server further sends a query request corresponding to the candidate option 702 to the mobile phone when the first server sends the candidate option 702 "the East Gate of People's Park", and a taxi hailing sentence template in the query request is "take a taxi from {the East Gate of People's Park} to {Qianmen}", the mobile phone may further establish a correspondence between the candidate option 702 and the query request in the first card 701, namely, a correspondence between the candidate option 702 and the taxi hailing sentence template "take a taxi from {the East Gate of People's Park} to {Qianmen}". Subsequently, if the mobile phone detects that the user taps the candidate option 702 in the first card 701, the mobile phone may send the corresponding query request to the first server to re-extract slot information.

S506. In response to an operation of selecting the first candidate option from the first card by the user, the mobile phone indicates the first server to update the first slot information, where the updated first slot information is the first candidate option.

Figures 8A, 8B:
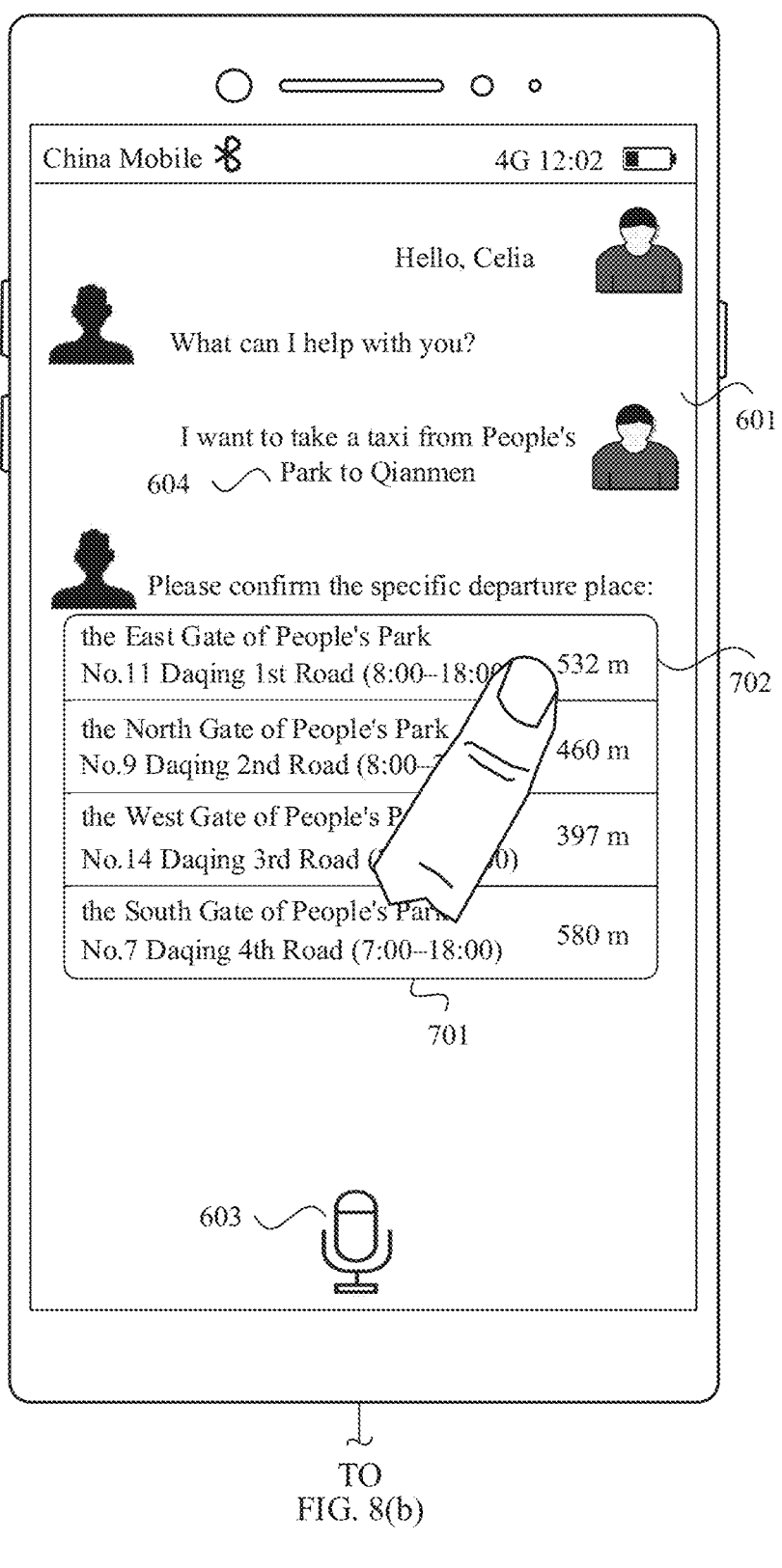
FIG. 8(a) and FIG. 8(b) are a schematic diagram 4 of a scenario of a voice interaction method according to an embodiment of this application.
Figure 8B:
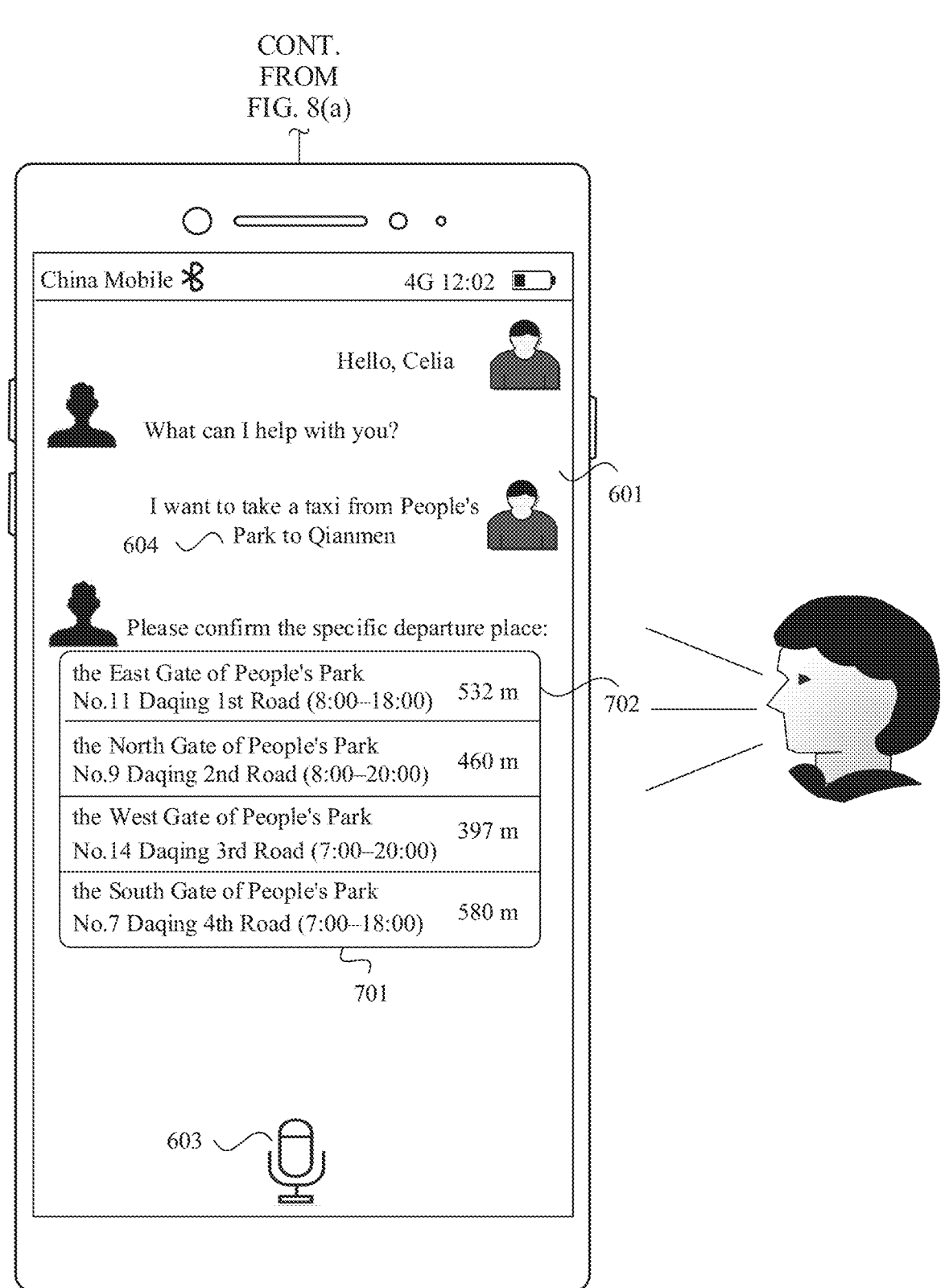

As shown in FIG. 8(a), after the mobile phone displays the first card 701 in the dialog interface 601 of the voice assistant app, the user may select one of the plurality of candidate options in the first card 701 through tapping. Alternatively, as shown in FIG. 8(b), after the mobile phone displays the first card 701 in the dialog interface 601 of the voice assistant app, the user may select one of the plurality of candidate options in the first card 701 through voice.

For example, if the mobile phone detects that the user taps the first candidate option 702 in the first card 701, the mobile phone may send the first candidate option 702 to the first server, namely, the East Gate of People's Park. The first server stores the query request corresponding to the East Gate of People's Park, and the query request includes the fourth taxi hailing sentence template "take a taxi from {the East Gate of People's Park} to {Qianmen}". Therefore, the first server may re-extract, from the taxi hailing sentence template "take a taxi from {the East Gate of People's Park} to {Qianmen}" according to the NLU algorithm, user intent and slot information that correspond to the first voice input 604. A difference from step S502 is that first slot information extracted by the first server this time is the first candidate option 702 selected by the user, namely, the East Gate of People's Park.

Alternatively, if a correspondence between the first candidate option 702 and the query request that includes the fourth taxi hailing sentence template has been established on the mobile phone, after the mobile phone detects that the user taps the first candidate option 702 in the first card 701, the mobile phone may send the query request (for example, the first query request) corresponding to the first candidate option 702 to the first server. The first query request includes the fourth taxi hailing sentence template "take a taxi from {the East Gate of People's Park} to {Qianmen}" and is sent to the first server. Similarly, the first server may determine, through re-extraction from the first query request according to the NLU algorithm, that the first slot information is the first candidate option 702 selected by the user, namely, the East Gate of People's Park.

Figure 9:
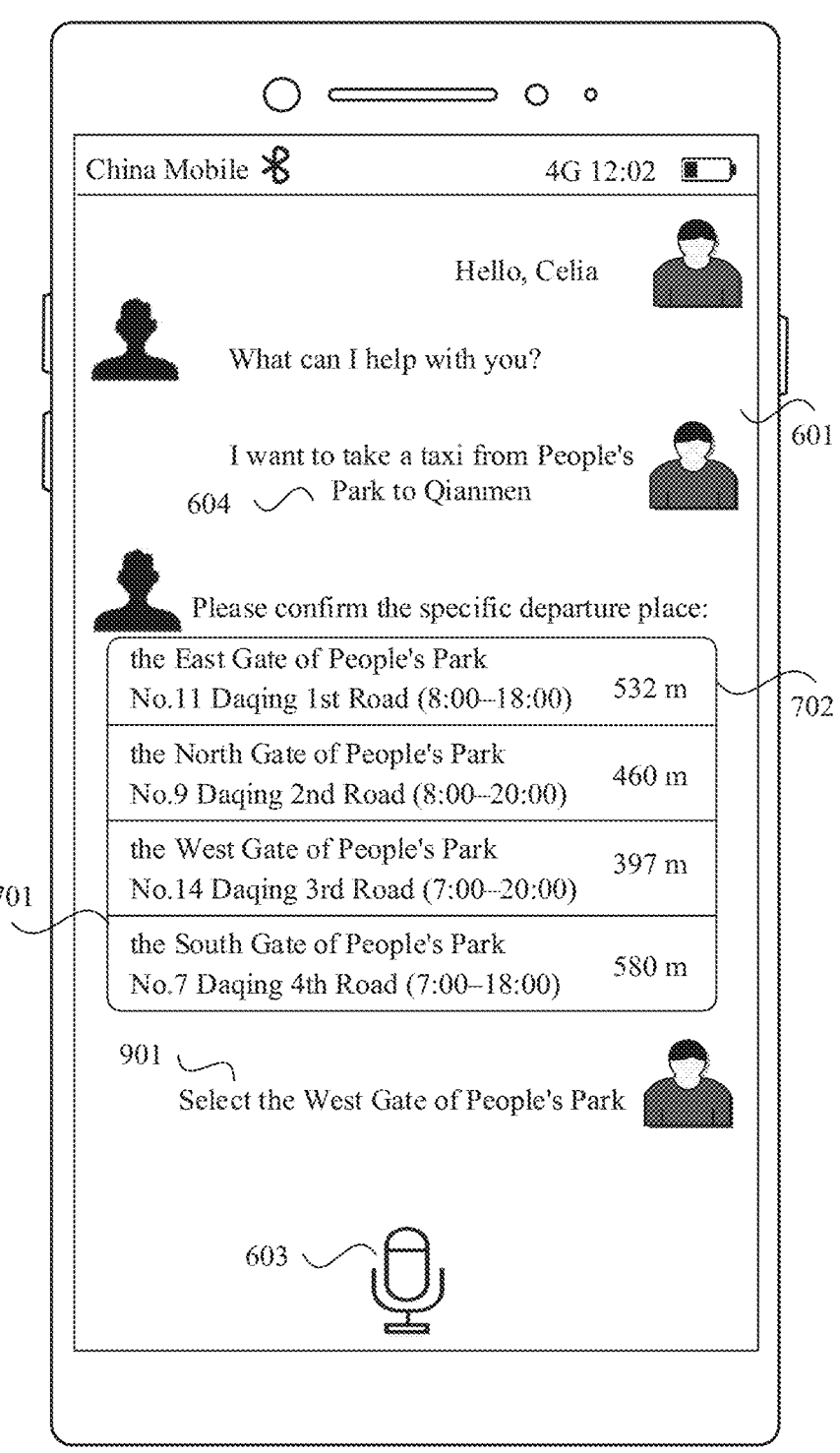
FIG. 9 is a schematic diagram 5 of a scenario of a voice interaction method according to an embodiment of this application.

Alternatively, as shown in FIG. 9, after the mobile phone displays the first card 701 in the dialog interface 601, if the mobile phone collects second voice input 901 of the user, and the second voice input 901 may be "select the East Gate of People's Park", the mobile phone may send the second voice input 901 to the first server. The first server may perform voice recognition on the second voice input 901 with reference to the dialog record between the user and the voice assistant, to recognize that the user selects the first candidate option 702 in the first card 701. In this case, the first server may determine, through extraction from the fourth taxi hailing sentence template in the first query request by using the first query request corresponding to the first candidate option 702, that new first slot information is the East Gate of People's Park.

It should be noted that the user may select a candidate option in the first card 701 in a voice form by using a natural language. For example, the second voice input 901 may be "I select the East Gate of People's Park". When detecting that the second voice input 901 includes the candidate option "the East Gate of People's Park", the first server may recognize that the user selects the first candidate option 702 in the first card 701. For another example, the second voice input 901 may be "select the first place", and the first server may recognize, with reference to the dialog record between the user and the voice assistant, that an option that corresponds to the voice input "select the first place" and that is in the first card 701 is the first candidate option 702. For another example, the second voice input 901 may be "the East Gate". The first server may recognize, with reference to the dialog record between the user and the voice assistant, that "the East Gate" is "the East Gate of People's Park". Further, the first server may determine that the user selects the first candidate option 702 in the first card 701.

Figure 10A:
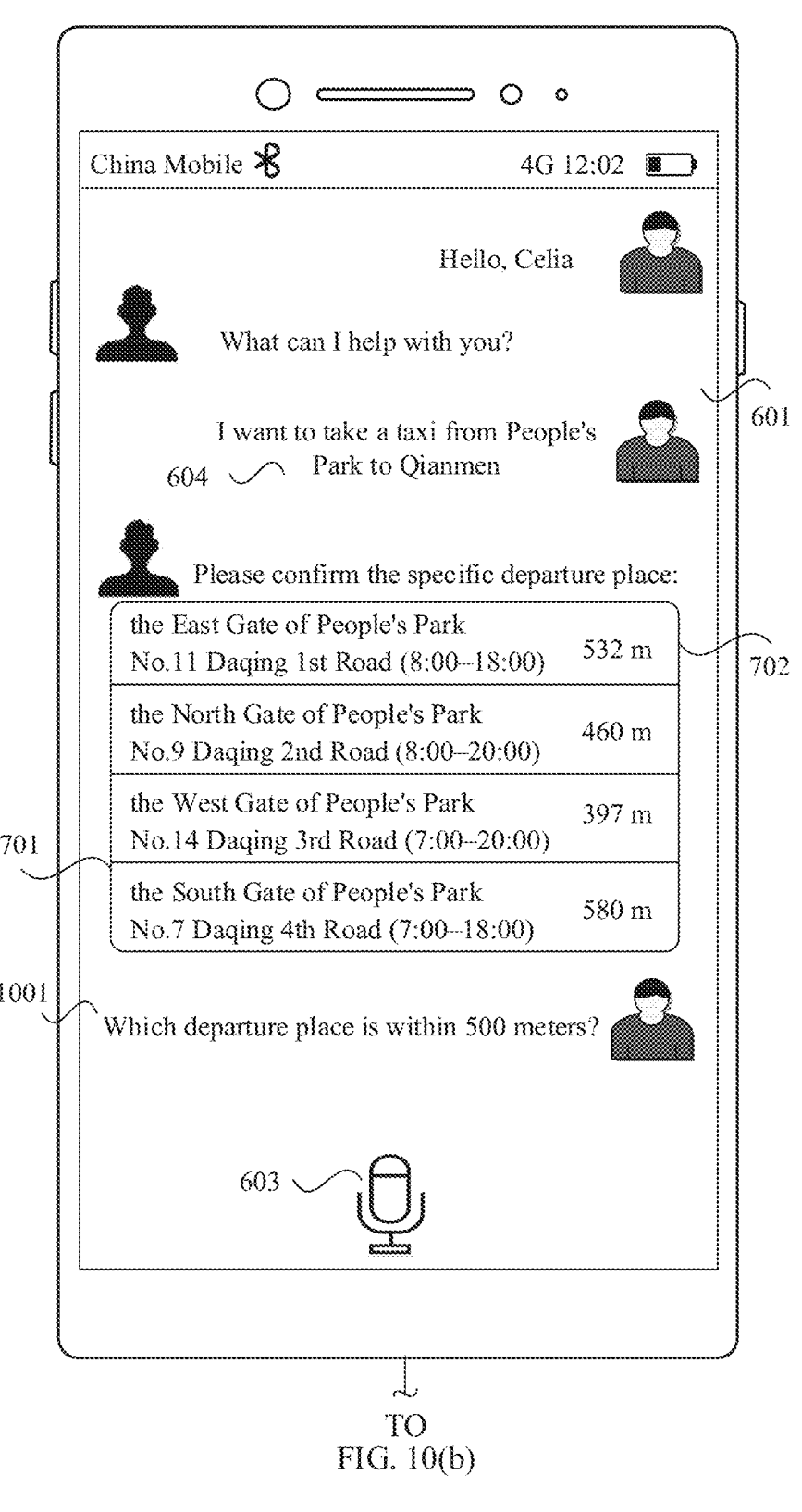

In some other embodiments, after the mobile phone displays the first card 701 in the dialog interface 601, the user may further screen the candidate options in the first card 701. As shown in FIG. 10(*a*), the user may input third voice input 1001 "which departure place is within 500 meters" to the mobile phone. Further, the mobile phone may send the third voice input 1001 to the first server. The first server records detailed information of each candidate option in the first card 701. Therefore, after recognizing and understand the third voice input 1001, the first server may select, through screening, one or more candidate options within a distance of 500 meters from the user from the foregoing four candidate options for the user based on a distance between each candidate option and the user. For example, the first server may send, to the mobile phone, "the West Gate of People's Park" and "the North Gate of People's Park" that are selected through screening. In this case, as shown in FIG. 10(*b*), the mobile phone may display, in the dialog interface 601, a card 1002 that is used to respond to the third voice input 1001. The card 1002 includes the candidate options that are within a distance of 500 meters from the user and that are selected through screening by the first server for the user. In this way, the user may continue to select a corresponding candidate option from the card 1002 as the first slot information in the first voice input 604.

S507. The first server requests, based on the update first slot information, the second server to respond to the first voice input.

An example in which the first server updates the first slot information to "the East Gate of People's Park" is used. The first server may send a second service request to the server (namely, the second server) of the Didi Taxi app. The second service request includes the user intent (namely, taxi hailing) extracted in step S506, the updated first slot information (namely, the East Gate of People's Park), and the second slot information (namely, Qianmen).

After the server of the Didi Taxi app receives the second service request sent by the first server, similar to step S503, before providing a current taxi hailing service to the user, the second server needs to determine clear departure place information (namely, the first slot information) and destination information (namely, the second slot information). The second server may determine, based on the updated first slot information, that a departure place of the current taxi hailing service is the East Gate of People's Park.

However, if the second server finds a plurality of addresses associated with the second slot information (namely, Qianmen), it indicates that the destination that is input by the user in the first voice input 604 is not accurate. Similarly, the second server may send, to the first server as candidate options, the plurality of found addresses associated with the second slot information (namely, Qianmen). For example, the candidate options include a detailed address of Qian Men Station, a detailed address of Qianmen Avenue, and a detailed address of Qianmen Building.

S508. After receiving M candidate options that is of the second slot information and that are sent by the second server, the first server sends the M candidate options to the mobile phone.

Similarly to step S504, after the first server receives the M candidate options that are of the second slot information and that are sent by the server of the Didi Taxi app, the first server may establish a correspondence between each candidate option in the M candidate options and a corresponding query request. In addition to the first candidate option selected by the user for the first slot information in step S506, each query request further includes a corresponding candidate option of the second slot information.

An example in which the query request includes a taxi hailing sentence template is still used. The taxi hailing sentence template is "take a taxi from {first slot information} to {second slot information}". Because it has been determined that the first slot information is the East Gate of People's Park, in this case, taxi hailing sentence templates in M query requests corresponding to the second slot information are "take a taxi from {the East Gate of People's Park} to {second slot information}", where {second slot information} may be filled with a corresponding candidate option of the second slot information.

For example, a first candidate option of the second slot information is the detailed address of Qian Men Station, and the first candidate option corresponds to a first query request.

The first query request may include a first taxi hailing sentence template, and the first taxi hailing sentence template is: "take a taxi from {the East Gate of People's Park} to {Qian Men Station}". In this case, in the first taxi hailing sentence template, the first slot information is {the East Gate of People's Park} determined in step S506, and the second slot information is {Qian Men Station}.

For example, a second candidate option of the second slot information is the detailed address of Qianmen Avenue, and the second candidate option corresponds to a second query request. The second query request may include a second taxi hailing sentence template, and the second taxi hailing sentence template is: "take a taxi from {the East Gate of People's Park} to {Qianmen Avenue}". In this case, in the second taxi hailing sentence template, the first slot information is {the East Gate of People's Park} determined in step S506, and the second slot information is {Qianmen Avenue}.

For example, a third candidate option of the second slot information is the detailed address of Qianmen Building, and the third candidate option corresponds to a third query request. The third query request may include a third taxi hailing sentence template, and the third taxi hailing sentence template is: "take a taxi from {the East Gate of People's Park} to {Qianmen Building}". In this case, in the third taxi hailing sentence template, the first slot information is {the East Gate of People's Park} determined in step S506, and the second slot information is {Qianmen Building}.

Certainly, the first server may update the second slot information in the first voice input 604 to a corresponding candidate option, and add the updated second slot information into a query request. In this case, the first slot information in the first voice input 604 is the East Gate of People's Park selected by the user in step S506. This is not limited in this embodiment of this application.

Further, the first server may send the three candidate options of the second slot information to the mobile phone, or the first server may send the three candidate options of the second slot information and corresponding query requests to the mobile phone, to help the user subsequently select accurate destination information to complete the taxi hailing service.

S509. The mobile phone displays a second card in the dialog interface of the voice assistant app, where the second card includes the M candidate options.

Figure 11:
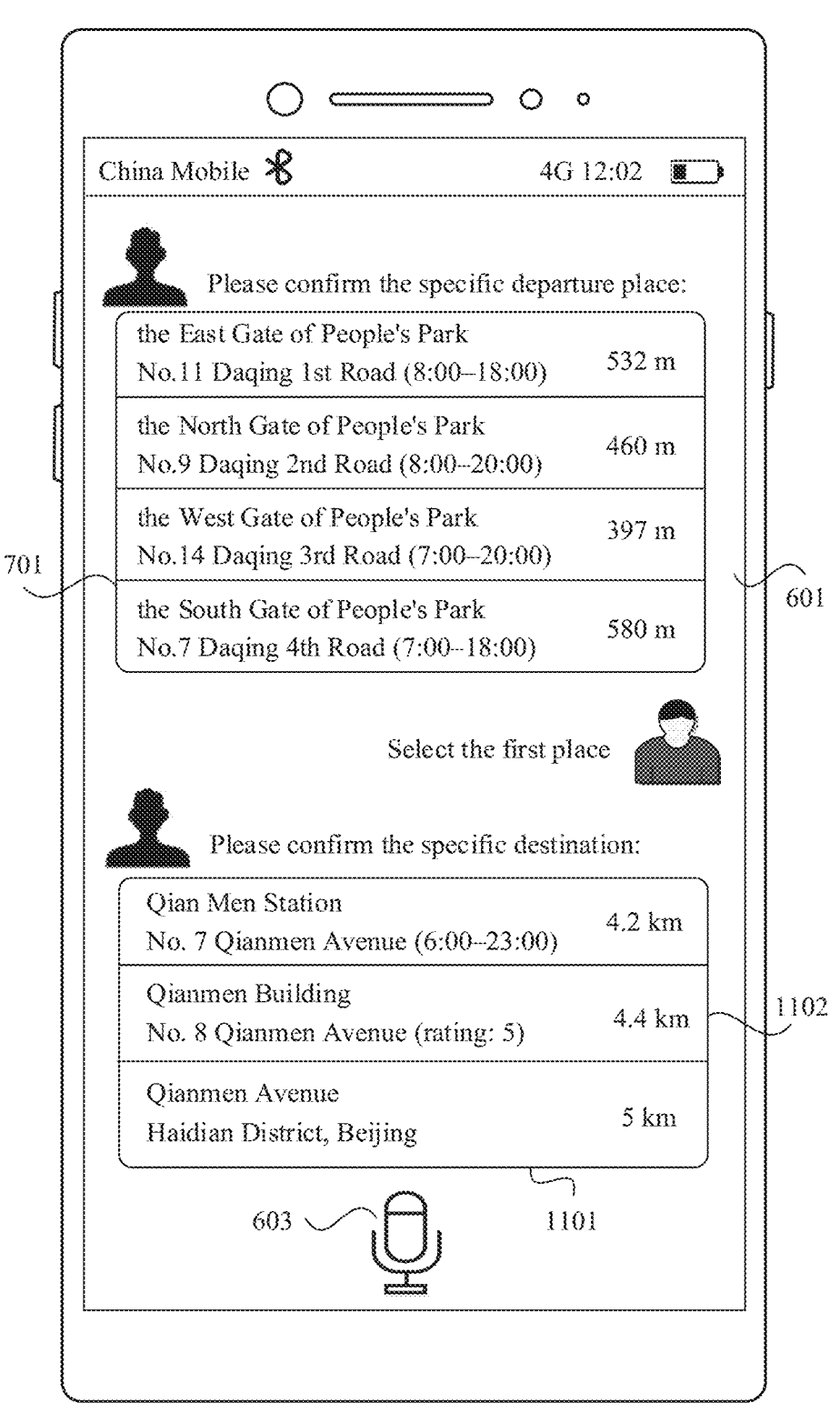
FIG. 11 is a schematic diagram 7 of a scenario of a voice interaction method according to an embodiment of this application.

After receiving the M candidate options that are of the second slot information and that are sent by the first server, similar to step S505, as shown in FIG. 11, the mobile phone may continue to display a second card 1101 in the dialog interface 601 of the voice assistant app. The second card 1101 includes the three pieces of specific destination information that is related to "Qianmen" and that is found by the server of the Didi Taxi app, namely, the detailed address of Qian Men Station, the detailed address of Qianmen Avenue, and the detailed address of Qianmen Building. The pieces of destination information are also the candidate options of the second slot information in the first voice input 604.

A candidate option 1102 "Qianmen Building" in the second card 1101 is used as an example. If the first server sends the candidate option 1102 and a corresponding query request to the mobile phone, because the query request includes the taxi hailing sentence template "take a taxi from {the East Gate of People's Park} to {Qianmen Building}", the mobile phone may establish a correspondence between the candidate option 1102 and the taxi hailing sentence template "take a taxi from {the East Gate of People's Park} to {Qianmen Building}" in the second card 1101.

Certainly, the mobile phone may first display the second card 1101 for the user to select the destination information, and then display the first card 701 for the user to select the departure place information. Alternatively, the second server may display the first card 701 and the second card 1101 in the dialog interface 601 at the same time. This is not limited in this embodiment of this application.

S510. The mobile phone switches the voice assistant app to the background for running.

After the mobile phone displays the second card 1101 in the dialog interface 601 of the voice assistant app, if the mobile phone detects a preset event that interrupts the dialog between the user and the voice assistant app, the mobile phone does not end a process of the voice assistant app (that is, does not kill the voice assistant app), but switches the voice assistant app to the background to continue to run the app.

Figure 12:
FIG. 12 is a schematic diagram 8 of a scenario of a voice interaction method according to an embodiment of this application.

The preset event may be actively triggered by the user. For example, the preset event may be an operation of tapping a back button or a home button by the user, or the preset event may be an operation of opening a notification message, a pull-up menu, a drop-down menu, or the like by the user. Alternatively, the preset event may be an event passively received by the mobile phone. For example, as shown in FIG. 12, after the mobile phone displays the second card 1101 in the dialog interface 601 of the voice assistant app, if the mobile phone receives an incoming call event, the mobile phone may display an incoming call interface 1201 of a call application. In this case, the mobile phone may switch the voice assistant app to the background for running.

S511. After switching the voice assistant app running from background to foreground, the mobile phone displays the dialog interface again, where the dialog interface includes the second card.

Figure 13:
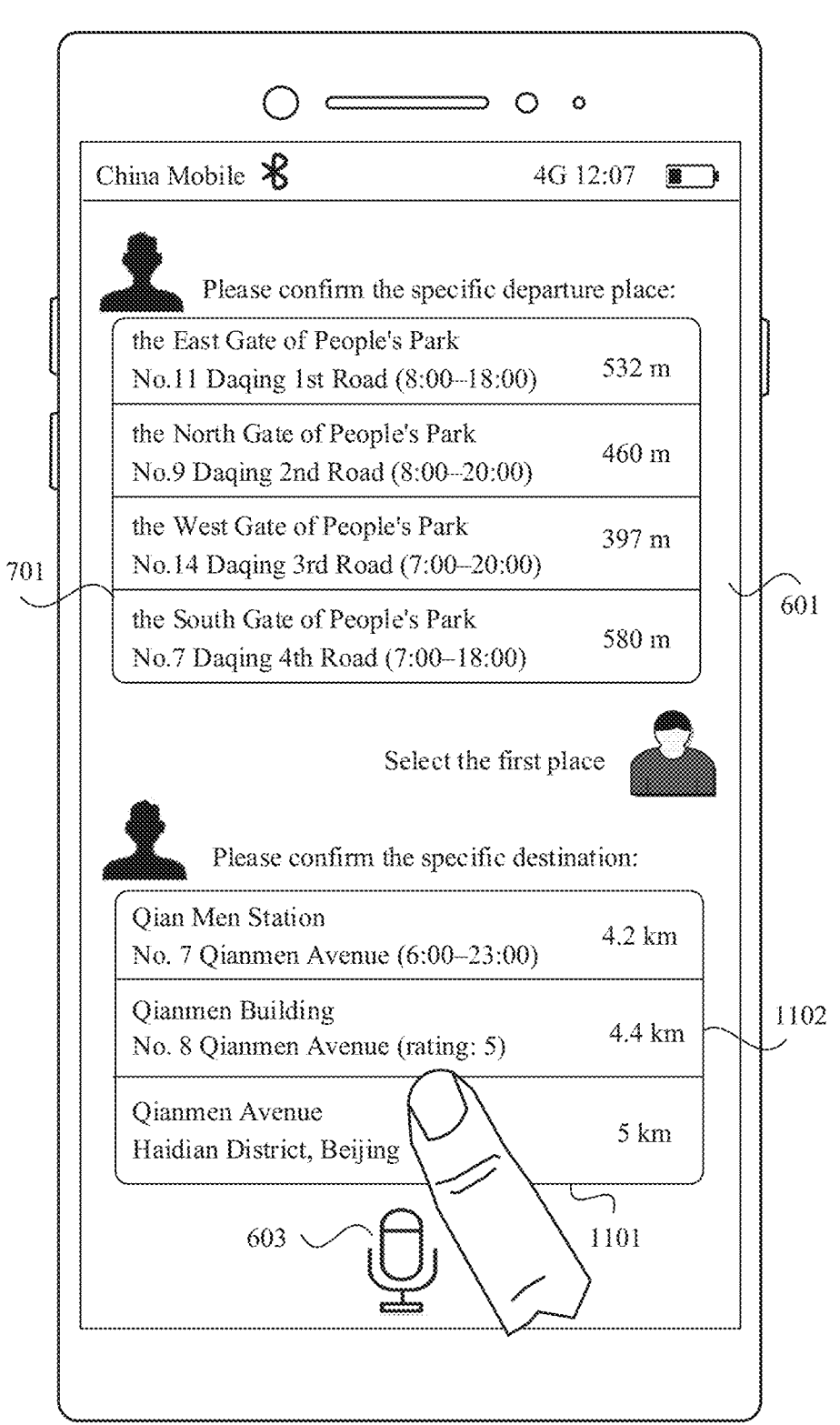
FIG. 13 is a schematic diagram 9 of a scenario of a voice interaction method according to an embodiment of this application.

The incoming call event is still used as an example. After the user is on a call for 5 minutes, the mobile phone detects that the user ends the current call. In this case, the mobile phone may automatically switch, to foreground again, the voice assistant app that originally runs in foreground. In this case, as shown in FIG. 13, the mobile phone may display the dialog interface 601 of the voice assistant app again, and the dialog content that is between the user and the voice assistant app and that exists when the voice assistant app is switched to the background is further displayed in the dialog interface 601. For example, the second card 1101 is further displayed in the dialog interface 601, and the second card 1101 includes the M candidate options of the second slot information.

Certainly, the user may find, in a multi-task window of the mobile phone, applications that currently runs in the background, and switch, running to foreground, the voice assistant app that currently runs in the background. Alternatively, after the voice assistant app is switched to run in the background, the user may wake up the voice assistant app again by using wakeup voice or a button, and switch the voice assistant app running from background to foreground. This is not limited in this embodiment of this application.

S512. In response to an operation of selecting the second candidate option from the second card by the user, the mobile phone indicates the first server to update the first slot information and the second slot information, where the updated first slot information is the first candidate option, and the updated second slot information is the second candidate option.

Still as shown in FIG. 13, the user may select one of the plurality of candidate options in the second card 1101 through tapping. Alternatively, the user may select one or more of the plurality of candidate options in the second card 1101 through voice.

For example, if the mobile phone detects that the user taps the second candidate option 1102 in the second card 1101, the mobile phone may send the second candidate option 1102 to the first server, namely, Qianmen Building. The first server stores the taxi hailing sentence template "take a taxi from {the East Gate of People's Park} to {Qianmen Building}" corresponding to the second candidate option 1102. Therefore, the first server may determine, through re-extraction from the taxi hailing sentence template "take a taxi from {the East Gate of People's Park} to {Qianmen Building}" according to the NLU algorithm, that the first slot information is the East Gate of People's Park and the second slot information is Qianmen Building.

Alternatively, if a correspondence between the second candidate option 1102 and the query request that includes the taxi hailing sentence template "take a taxi from {the East Gate of People's Park} to {Qianmen Building}" has been established on the mobile phone, if the mobile phone detects that the user taps the second candidate option 1102 in the second card 1101, the mobile phone may send the corresponding query request to the first server. The query request includes the taxi hailing sentence template "take a taxi from {the East Gate of People's Park} to {Qianmen Building}". In this way, regardless of whether the first server stores the taxi hailing sentence template, the first server may determine, through re-extraction based on the taxi hailing sentence template "take a taxi from {the East Gate of People's Park} to {Qianmen Building}" carried in the query request, that the first slot information is the East Gate of People's Park and the second slot information is Qianmen Building.

In other words, even if the first server deletes a corresponding taxi hailing sentence template or dialog record because a current dialog between the user and the voice assistant app times out, because the mobile phone has recorded the first slot information previously selected by the user and established the correspondence between each candidate option of the second slot information and the taxi hailing sentence template, when the mobile phone runs the voice assistant app in foreground again, if the user selects an option in the second card 1101, the first server may still extract the first slot information and the second slot information in the first voice input 604, to resume the dialog between the user and the voice assistant app.

Certainly, after the mobile phone displays the second card 1101 in the dialog interface 601, the user may select a candidate option in the second card 1101 through voice. For example, if the mobile phone collects third voice input "select Qianmen Building" that is input by the user, the mobile phone may send the third voice input to the first server. The first server may perform voice recognition on the third voice input with reference to the dialog record between the user and the voice assistant, to recognize that the user selects the second candidate option 1102 in the second card 1101. In this case, the first server may determine, through re-extraction by using the query request corresponding to the second candidate option 1102 based on the taxi hailing sentence template in the query request, the first slot information is the East Gate of People's Park and the second slot information is Qianmen Building.

It may be learned that when the user selects the second slot information, the mobile phone (or the first server) has recorded the first slot information previously selected by the user. Therefore, after the voice assistant app is switched to foreground again, when the mobile phone sends, to the first server, the second slot information selected by the user, the first server may still determine the first slot information selected by the user before the voice assistant app is switched to foreground again, to resume the dialog between the user and the voice assistant app.

S513. The first server requests, based on the update first slot information and second slot information, the second server to respond to the first voice input.

An example in which the updated first slot information is the East Gate of People's Park and the updated second slot information is Qianmen Avenue is used. The first server may send a third service request to the server (namely, the second server) of the Didi Taxi app. The third service request includes the user intent (namely, taxi hailing), the updated first slot information (namely, the East Gate of People's Park), and the updated second slot information (namely, Qianmen Building).

After the server of the Didi Taxi app receives the third service request sent by the first server, similar to steps S503 and S507, the second server may determine, based on the user intent in the third service request, to provide a taxi hailing service to the user. Departure place information of the taxi hailing service is the first slot information (namely, the East Gate of People's Park), and destination information of the taxi hailing service is the second slot information (namely, Qianmen Building). Because both the East Gate of People's Park and Qianmen Building are place names with clear addresses, the server of the Didi Taxi app may generate a taxi hailing order to respond to the first voice input 604. A departure place in the taxi hailing order is the East Gate of People's Park and a destination is Qianmen Building. Further, the server of the Didi Taxi app may send the generated taxi hailing order to the first server.

S514. After receiving a response result that is of the first voice input and that is sent by the second server, the first server sends the response result to the mobile phone.

S515. The mobile phone displays the response result in the dialog interface of the voice assistant app.

Figure 14:
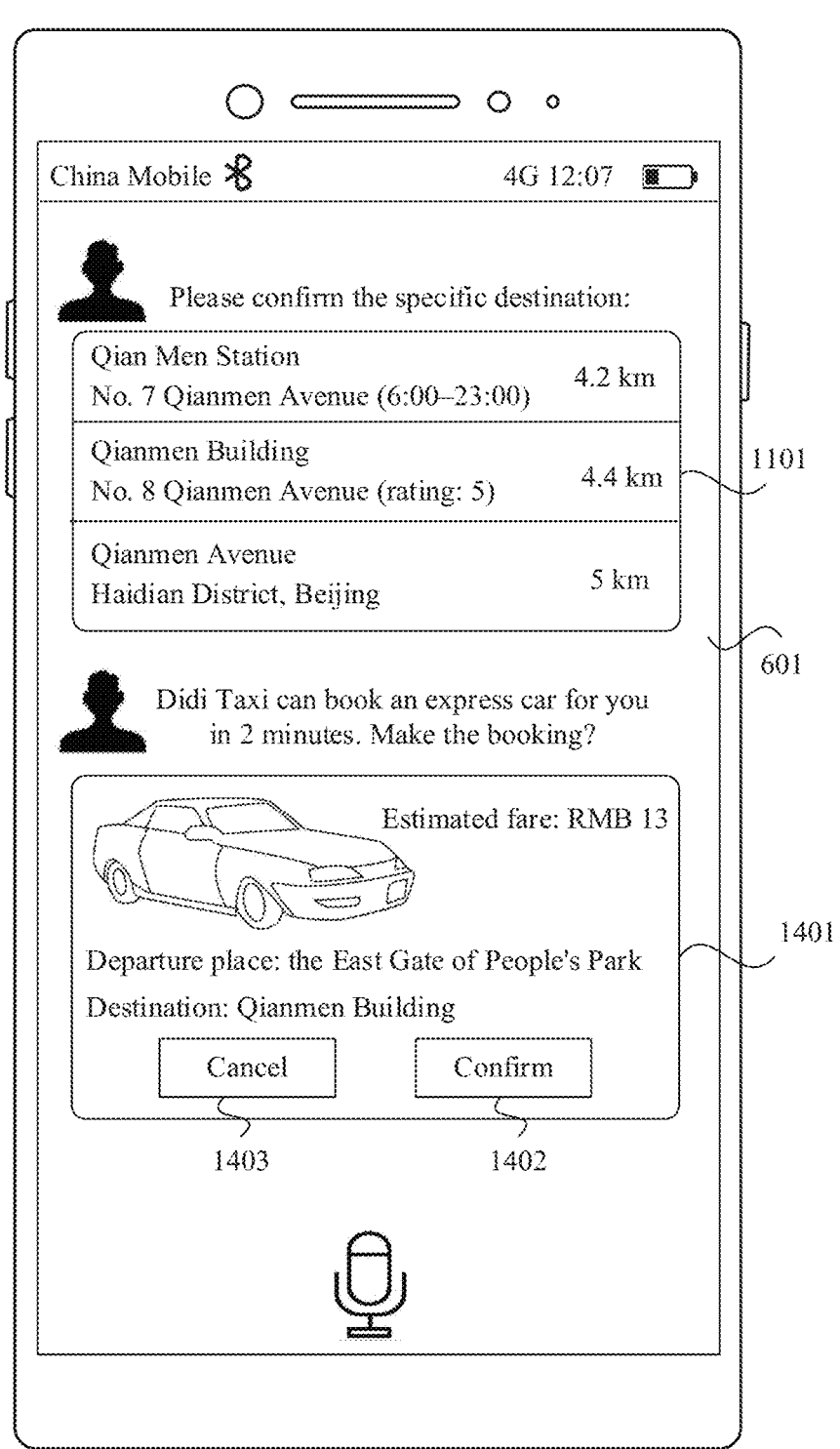
FIG. 14 is a schematic diagram 10 of a scenario of a voice interaction method according to an embodiment of this application.

After receiving the taxi hailing order generated by the server of the Didi Taxi app in response to the first voice input 604, the first server may send the taxi hailing order to the mobile phone. Further, as shown in FIG. 14, the mobile phone may display a third card 1401 in the dialog interface 601 of the voice assistant app, and the third card 1401 includes the taxi hailing order sent by the first server. The third card 1401 further includes a confirmation button 1402 of the taxi hailing order and a cancellation button 1403 of the taxi hailing order.

If the mobile phone detects that the user taps the cancellation button 1403, or detects that the user inputs voice input "cancel taxi hailing", the mobile phone may send an order cancellation indication to the first server. After receiving the order cancellation indication, the first server may send a response message of order cancellation to the server of the Didi Taxi app, and the server of the Didi Taxi app may cancel the current taxi hailing service.

Correspondingly, if the mobile phone detects that the user taps the confirmation button 1402, or detects that the user inputs voice input "confirm taxi hailing", the mobile phone may send an order confirmation indication to the first server. After receiving the order confirmation indication, the first server may send a response message of order confirmation to the server of the Didi Taxi app. Further, the server of the Didi Taxi app may start to provide the current taxi hailing service to the user. In addition, after the mobile phone detects that the user taps the confirmation button 1402, or detects that the user input the voice input "confirm taxi hailing", the mobile phone may automatically open the Didi Taxi app in foreground, and the user may view related information of the current taxi hailing order in the Didi Taxi app. In this case, the mobile phone may switch the voice assistant app to the background for running. In other words, before the mobile phone receives the taxi hailing order, the mobile phone may help, by using a plurality of rounds of dialogs between the user and the voice assistant in the dialog interface of the voice assistant app, the user determine the related information of the current taxi hailing order. The mobile phone can help the user determine the related information of the current taxi hailing service without jumping to an interface of the Didi Taxi app. This improves intelligent voice interaction experience.

It may be learned that in this embodiment of this application, the mobile phone or the server may record slot information selected by the user in each voice task. In this way, even if a dialog between the user and the voice assistant app is interrupted, when the mobile phone runs the voice assistant app in foreground again, the user does not need to input the selected slot information to the voice assistant app again. In this way, the user can continue to complete the interrupted dialog with the voice assistant app at any moment. This improves working efficiency and user experience of the voice assistant app on the mobile phone.

Figure 15:
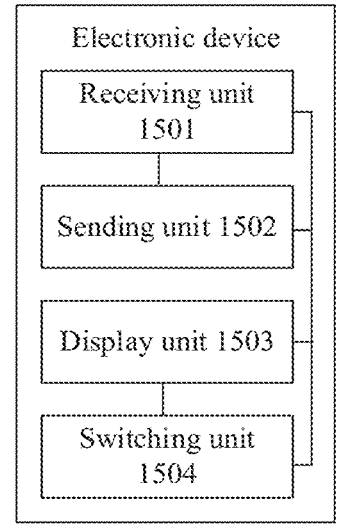
FIG. 15 is a schematic structural diagram 2 of an electronic device according to an embodiment of this application.

As shown in FIG. 15, an embodiment of this application discloses an electronic device. The electronic device may be configured to implement the method described in the foregoing method embodiments. The electronic device may specifically include a receiving unit 1501, a sending unit 1502, a display unit 1503, and a switching unit 1504. The receiving unit 1501 is configured to support the electronic device in performing processes S501, S504, S508, and S514 in FIG. 5A and FIG. 5B. The sending unit 1502 is configured to support the electronic device in performing processes S502, S506, and S512 in FIG. 5A and FIG. 5B. The display unit 1503 is configured to support the electronic device in performing processes S505, S509, S511, and S515 in FIG. 5A and FIG. 5B. The switching unit 1504 is configured to support the electronic device in performing the process S510 in FIG. 5B. All related content of the steps in the foregoing method embodiments may be cited in function descriptions of corresponding functional modules. Details are not described herein again.

Figure 16:
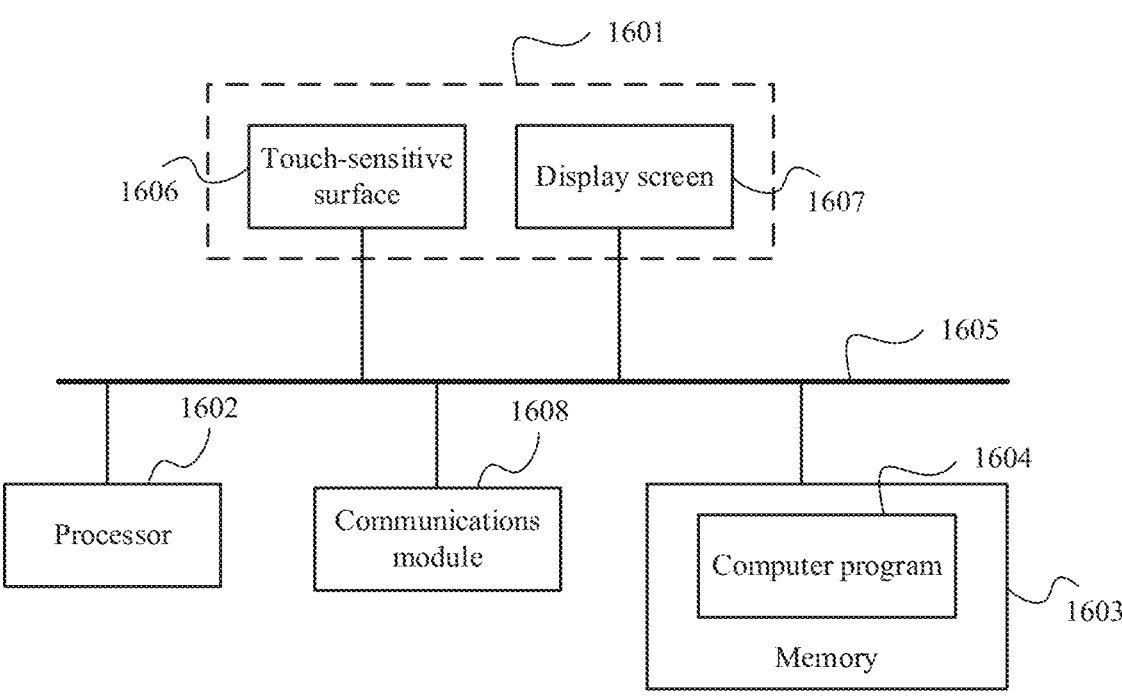
FIG. 16 is a schematic structural diagram 3 of an electronic device according to an embodiment of this application.

As shown in FIG. 16, an embodiment of this application discloses an electronic device, including a touchscreen 1601, where the touchscreen 1601 includes a touch-sensitive surface 1606 and a display screen 1607, one or more processors 1602, a memory 1603, a communications module 1608, and one or more computer programs 1604. The components may be connected by using one or more communications buses 1605. The one or more computer programs 1604 are stored in the memory 1603 and are configured to be executed by the one or more processors 1602. The one or more computer programs 1604 include instructions, and the instructions may be used to perform the steps in the foregoing embodiments.

For example, the processor 1602 may be specifically the processor 110 shown in FIG. 1. The memory 1603 may be specifically the internal memory 121 and/or the external memory 120 shown in FIG. 1. The display screen 1607 may be specifically the display screen 194 shown in FIG. 1. The communications module 1608 may be specifically the mobile communications module 150 and/or the wireless communications module 160 shown in FIG. 1. The touch-sensitive surface 1606 may be specifically the touch sensor in the sensor module 180 shown in FIG. 1. This is not limited in this embodiment of this application.

The foregoing descriptions about implementations allow a person skilled in the art to understand that, for the purpose of convenient and brief description, division into the functional modules is used as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application embodiment, but are not intended to limit the protection scope of this application embodiment. Any variation or replacement within the technical scope disclosed in this application embodiment shall fall within the protection scope of this application embodiment. Therefore, the protection scope of the embodiments of this application shall be subject to the protection scope of the claims.

What is claimed is:

1. A method comprising:
   receiving a first operation of waking up a voice assistant application from a user;
   displaying, in response to the first operation and in a foreground state, a first interface configured to display dialog content between the user and the voice assistant application;
   receiving a first voice input from the user, wherein the first voice input comprises first slot information;
   displaying, in response to the first voice input, a first card in the first interface, wherein the first card comprises N candidate options of the first slot information, wherein the N candidate options are in a first one-to-one correspondence with N query requests, wherein each query request in the N query requests carries a corresponding candidate option of the first slot information, and wherein N≥1;
   receiving a second voice input from the user, wherein the second voice input comprises a screening condition for filtering the N candidate options;

displaying, in response to the second voice input, a second card in the first interface, wherein the second card comprises one or more candidate options that meet the screening condition, and wherein in response to detecting an interrupting event:

switching the voice assistant application from the foreground state to a background state;

continuing to run the voice assistant application in the background state;

automatically switching the voice assistant application from the background state back to the foreground state after the interrupting event ends; and re-displaying the first interface including the second card;

receiving a second operation of selecting a first candidate option among the one or more candidate options in the second card from the user; and sending, in response to the second operation, a first query request corresponding to the first candidate option to a first server to provide a service result corresponding to the first voice input.

2. The method of claim 1, further comprising receiving a third voice input that comprises the first candidate option.

3. The method of claim 1, wherein after receiving the first voice input from the user, the method further comprises:

sending the first voice input to the first server; and receiving, in response to the first voice input, the first one-to-one correspondence from the first server.

4. The method of claim 1, further comprising receiving the first operation of waking up the voice assistant application when running the voice assistant application in foreground.

5. The method of claim 1, further comprising receiving a tapping operation on the first candidate option in the first card.

6. The method of claim 1, wherein the first voice input further comprises second slot information, and wherein the method further comprises displaying a third card in the first interface, wherein the third card comprises M candidate options of the second slot information, wherein the M candidate options are in a second one-to-one correspondence with M query requests, wherein the M query requests all carry the first candidate option from the user, wherein each query request in the M query requests carries a corresponding candidate option of the second slot information, and wherein M≥1.

7. The method of claim 6, further comprising receiving a third operation of selecting a second candidate option of the M candidate options from the user.

8. The method of claim 7, further comprising sending, in response to the third operation, a second query request corresponding to the second candidate option to the first server.

9. The method of claim 7, further comprising receiving a tapping operation on the second candidate option in the third card.

10. The method of claim 7, further comprising receiving a third voice input that comprises the second candidate option.

11. An electronic device, comprising:

a memory configured to store instructions; and a processor coupled to the memory and configured to execute the instructions to cause the electronic device to:

receive a first operation of waking up a voice assistant application from a user;

display, in response to the first operation and in a foreground state, a first interface configured to display dialog content between the user and the voice assistant application;

receive a first voice input from the user, wherein the first voice input comprises first slot information;

display, in response to the first voice input, a first card in the first interface, wherein the first card comprises N candidate options of the first slot information, wherein the N candidate options are in a first one-to-one correspondence with N query requests, wherein each query request in the N query requests carries a corresponding candidate option of the first slot information, and wherein N≥1;

receive a second voice input from the user, wherein the second voice input comprises a screening condition for filtering the N candidate options;

display, in response to the second voice input, a second card in the first interface, wherein the second card comprises one or more candidate options that meet the screening condition, and wherein in response to detecting an interrupting event:

switch the voice assistant application from the foreground state to a background state;

continue to run the voice assistant application in the background state;

automatically switch the voice assistant application from the background state back to the foreground state after the interrupting event ends; and re-display the first interface including the second card;

receive a second operation of selecting a first candidate option among the one or more candidate options in the second card from the user; and send, in response to the second operation, a first query request corresponding to the first candidate option to a first server to provide a service result corresponding to the first voice input.

12. The electronic device of claim 11, wherein the processor is further configured to execute the instructions to cause the electronic device to receive a third voice input that comprises the first candidate option.

13. The electronic device of claim 11, wherein the processor is further configured to execute the instructions to cause the electronic device to:

send the first voice input to the first server; and receive, in response to the first voice input, the first one-to-one correspondence from the first server.

14. The electronic device of claim 11, wherein the processor is further configured to execute the instructions to cause the electronic device to receive a tapping operation on the first candidate option in the first card.

15. A computer program product comprising computer-executable instructions stored on a non-transitory computer-readable storage medium that, when executed by one or more processors, cause an electronic device to:

receive a first operation of waking up a voice assistant application from a user;

display, in response to the first operation and in a foreground state, a first interface configured to display dialog content between the user and the voice assistant application;

receive a first voice input from the user, wherein the first voice input comprises first slot information;

display, in response to the first voice input, a first card in the first interface, wherein the first card comprises N candidate options of the first slot information, wherein the N candidate options are in a first one-to-one correspondence with N query requests, wherein each query request in the N query requests carries a corresponding candidate option of the first slot information, and wherein N≥1;

receive a second voice input from the user, wherein the second voice input comprises a screening condition for filtering the N candidate options;

display, in response to the second voice input, a second card in the first interface, wherein the second card comprises one or more candidate options that meet the screening condition, and wherein in response to detecting an interrupting event:

switch the voice assistant application from the foreground state to a background state;

continue to run the voice assistant application in the background state;

automatically switch the voice assistant application from the background state back to the foreground state after the interrupting event ends; and re-display the first interface including the second card;

receive a second operation of selecting a first candidate option among the one or more candidate options in the second card from the user; and send, in response to the second operation, a first query request corresponding to the first candidate option to a first server to provide a service result corresponding to the first voice input.

16. The computer program product of claim 15, wherein the computer-executable instructions that, when executed by the one or more processors, cause the electronic device to receive a third voice input that comprises the first candidate option.

17. The computer program product of claim 15, wherein the computer-executable instructions that, when executed by the one or more processors, cause the electronic device to receive a tapping operation on the first candidate option in the first card.

18. The computer program product of claim 15, wherein the interrupting event comprises receiving an incoming call.

19. The computer program product of claim 15, wherein the interrupting event comprises opening a notification message.

20. The computer program product of claim 15, wherein the interrupting event comprises tapping a back button or a home button.

\* \* \* \* \*